United States Patent
Kum et al.

(10) Patent No.: US 10,789,521 B2
(45) Date of Patent: Sep. 29, 2020

(54) MAGNETIC STRIPE DATA TRANSMISSION DEVICE AND METHOD

(71) Applicant: Samsung Electronics Co. Ltd., Gyeonggi-do (KR)

(72) Inventors: Junsig Kum, Gyeonggi-do (KR); Nikolay Olyunin, Gyeonggi-do (KR); Youngju Lee, Seoul (KR); Jungyub Lee, Gyeonggi-do (KR); Dohyuk Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/092,705

(22) PCT Filed: May 10, 2017

(86) PCT No.: PCT/KR2017/004820
§ 371 (c)(1),
(2) Date: Oct. 10, 2018

(87) PCT Pub. No.: WO2017/196075
PCT Pub. Date: Nov. 16, 2017

(65) Prior Publication Data
US 2019/0171920 A1 Jun. 6, 2019

(30) Foreign Application Priority Data
May 10, 2016 (KR) .................. 10-2016-0057176

(51) Int. Cl.
*H04B 5/00* (2006.01)
*G06K 7/08* (2006.01)
(Continued)

(52) U.S. Cl.
CPC ....... *G06K 19/06206* (2013.01); *G06F 21/31* (2013.01); *G06K 7/087* (2013.01);
(Continued)

(58) Field of Classification Search
CPC ........ G06K 7/082; G06K 7/084; G06K 7/087; H04B 5/00; H04B 5/0031; H04B 5/0075; H04B 5/0081
See application file for complete search history.

(56) References Cited

U.S. PATENT DOCUMENTS 8,579,203 B1 * 11/2013 Lambeth ............ G06Q 20/3415
235/380
8,814,046 B1 8/2014 Wallner
(Continued)

FOREIGN PATENT DOCUMENTS

CN 204926176 12/2015
KR 20120087429 8/2012
(Continued)

OTHER PUBLICATIONS

European Search Report dated Jun. 3, 2019 issued in counterpart application No. 17796375.8-1220, 11 pages.
(Continued)

*Primary Examiner* — Suezu Ellis
(74) *Attorney, Agent, or Firm* — The Farrell Law Firm, P.C.

(57) ABSTRACT

The present invention relates to a device for transmitting data and, particularly, to a device for transmitting data by using a magnetic stripe method. According to one embodiment of the present invention, the magnetic stripe data transmission device comprises: a coil to which a current is supplied in a first direction and a second direction, which is opposite to the first direction; a core for inducing a magnetic field when the current is supplied to the coil; a power source for supplying the current to the coil; driving units for intermittently supplying, to the coil, in the first direction or the second direction, a burst pulse or pseudo-burst pulse current supplied from the power source; and a control unit for outputting, to the driving units, a control signal in order
(Continued)

to perform control such that the current is supplied to the coil alternately in the first direction and the second direction, wherein the core can be made of a material having an aspect ratio value of at least 0.5, having a coercivity value of 1000-10,000 [A/m], and having pseudo-hard magnetic density of which the saturated magnetic flux density value is at least 1 [T].

16 Claims, 25 Drawing Sheets

(51) Int. Cl.
*G06K 19/06* (2006.01)
*G07F 7/08* (2006.01)
*G06Q 20/32* (2012.01)
*G06Q 20/20* (2012.01)
*G06F 21/31* (2013.01)

(52) U.S. Cl.
CPC ....... *G06Q 20/204* (2013.01); *G06Q 20/3278* (2013.01); *G07F 7/086* (2013.01); *G07F 7/0893* (2013.01); *H04B 5/00* (2013.01); *H04B 5/0031* (2013.01); *H04B 5/0075* (2013.01); *H04B 5/0081* (2013.01)

(56) References Cited

U.S. PATENT DOCUMENTS

| | | |
|---|---|---|
| 2013/0119779 A1 | 5/2013 | Jung |
| 2015/0235204 A1* | 8/2015 | Wallner ............... G06Q 20/322 705/39 |
| 2017/0140180 A1* | 5/2017 | Hoson ...................... G11B 5/09 |
| 2017/0249541 A1 | 8/2017 | Olyunin et al. |

FOREIGN PATENT DOCUMENTS

| | | |
|---|---|---|
| KR | 101241659 | 3/2013 |
| KR | 2013-0051659 | 5/2013 |
| KR | 20130072284 | 7/2013 |
| KR | 20160023750 | 3/2016 |
| KR | 20170100255 | 9/2017 |
| WO | WO 2006/089132 | 8/2006 |
| WO | WO 2015/126755 | 8/2015 |

OTHER PUBLICATIONS

European Search Report dated Feb. 18, 2019 issued in counterpart application No. 17796375.8-1220, 11 pages.
PCT/ISA/210 Search Report issued on PCT/KR2017/004820, dated Jun. 20, 2017, pp. 5.
PCT/ISA/237 Written Opinion issued on PCT/KR2017/004820, dated Jun. 20, 2017, pp. 14.

* cited by examiner

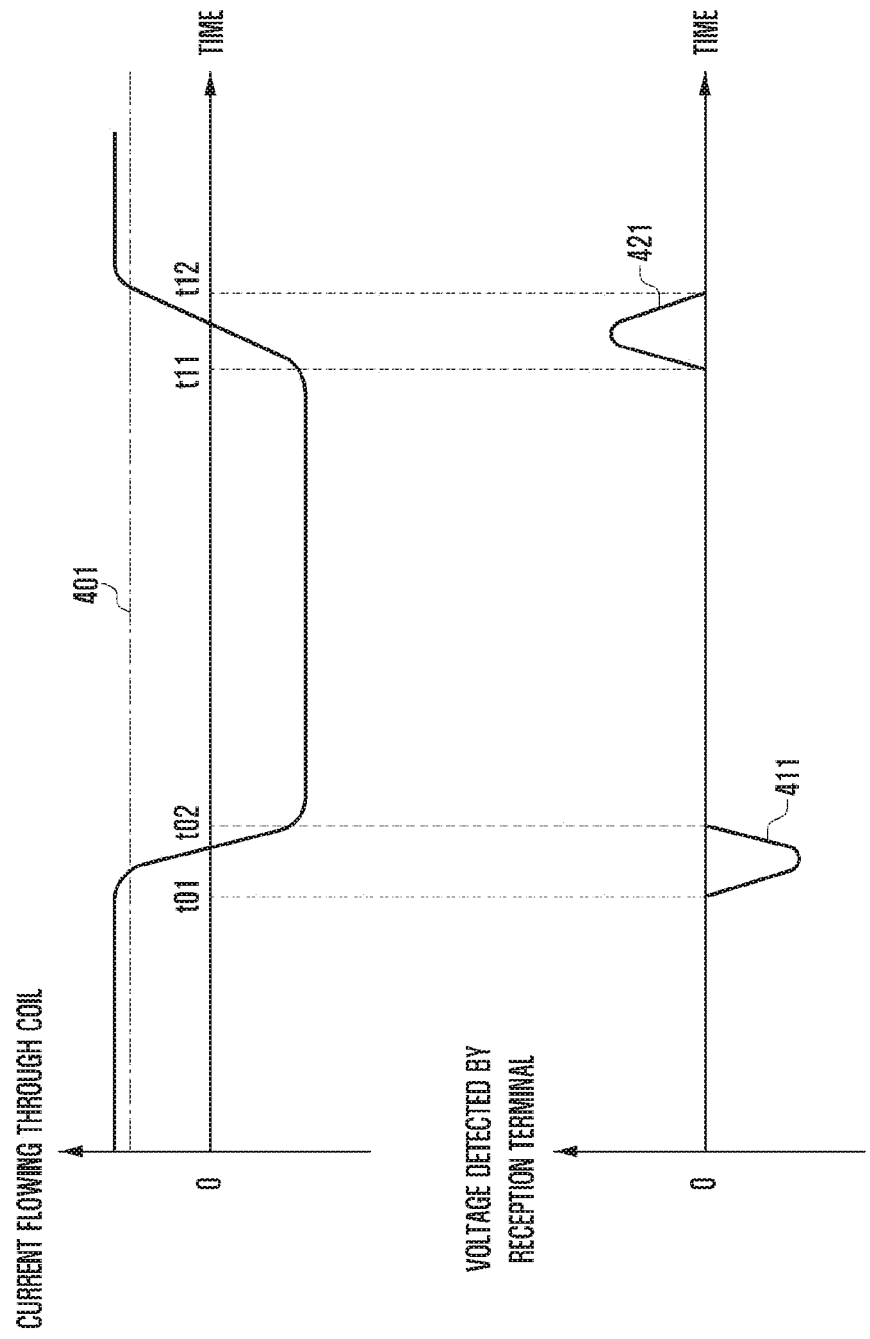

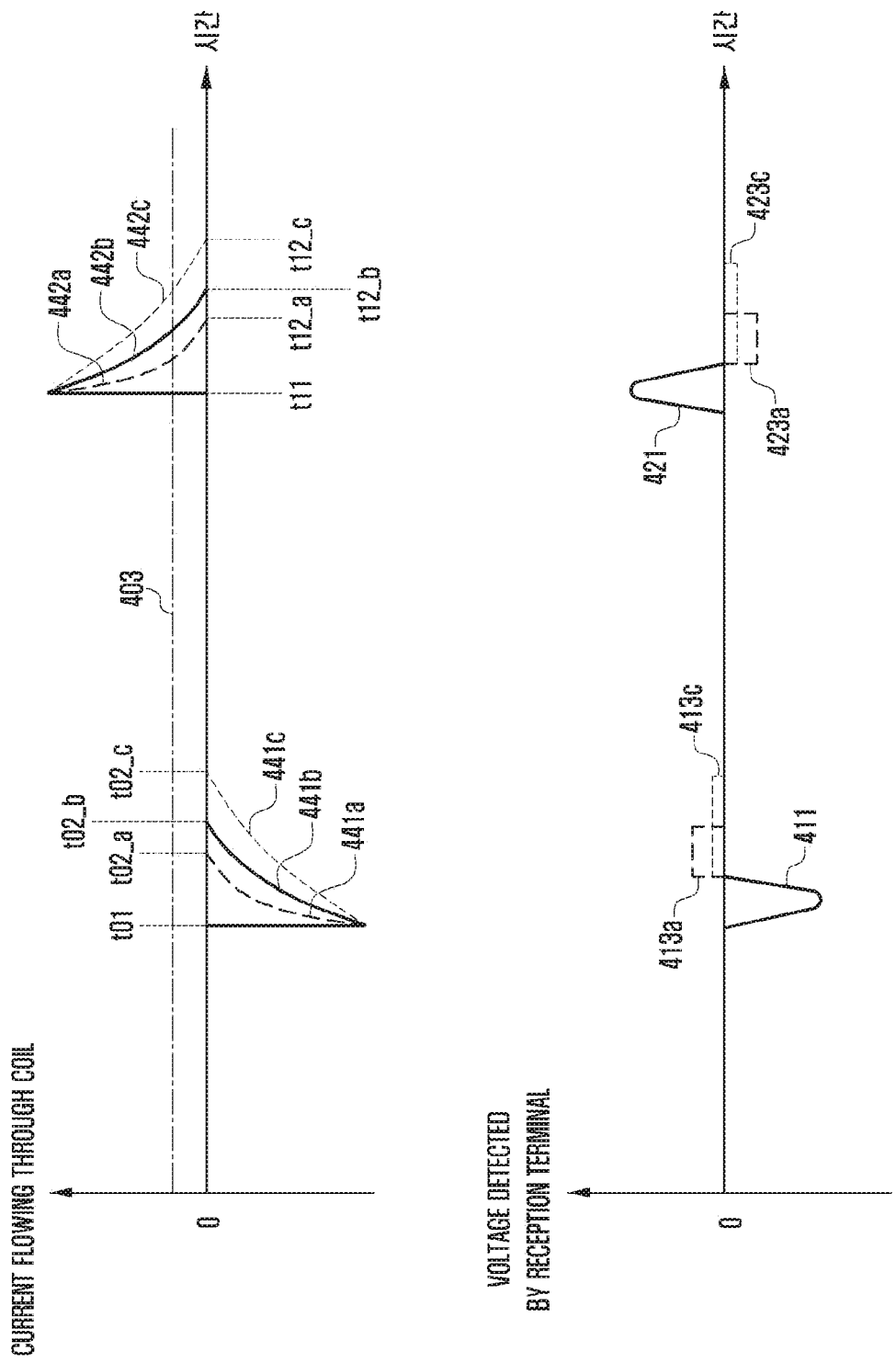

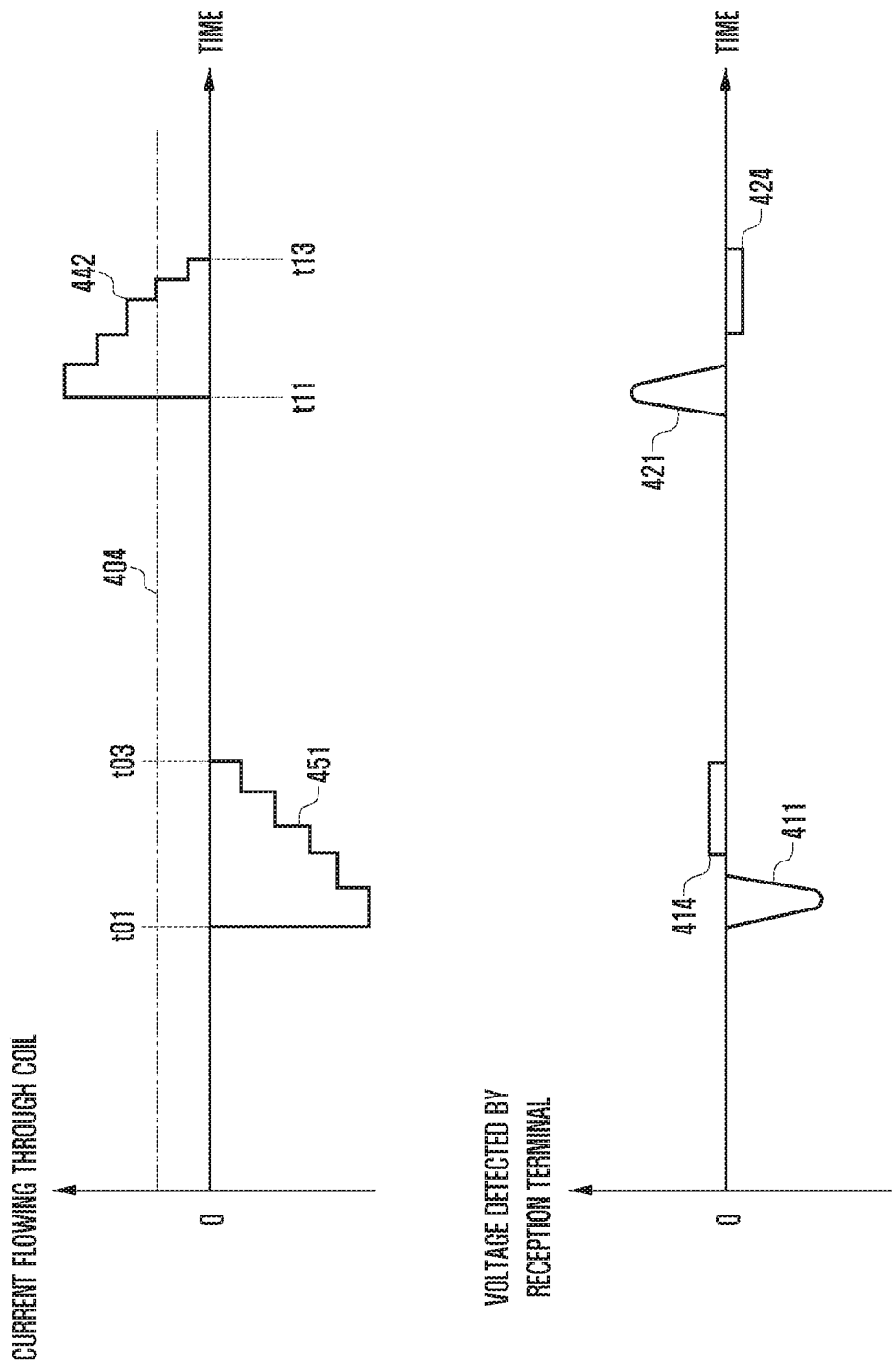

MAGNETIC STRIPE DATA TRANSMISSION DEVICE AND METHOD

PRIORITY

This application is a National Phase Entry of PCT International Application No. PCT/KR2017/004820 which was filed on May 10, 2017, and claims priority to Korean Patent Application No. 10-2016-0057176, which was filed on May 10, 2016, the content of each of which is incorporated herein by reference.

TECHNICAL FIELD

The present disclosure relates to a device and a method for data transmission, and more particularly, to a device and a method for magnetic stripe data transmission.

BACKGROUND ART

With the rapid development of electronic devices and communication technology, various types of data transmission devices have appeared one after another. Recently, as one of such data transmission schemes, a scheme for transmitting data using the change of magnetic field has been used or studied in various fields. This scheme for transmitting data using the change of magnetic field is called magnetic stripe data transmission. A representative system actually adopting and using the magnetic stripe data transmission scheme may be a point of sale (POS) system, and various types POS terminals have recently been used.

As POS type communications, very short-range communications have been used to transmit data mainly for credit card payment. For example, as transmission terminals transmitting data in the POS system, portable communication terminals have mainly been used, and cellular phones, tablet computers, and smart watches may also be used. Further, as reception terminals receiving data in the POS system, various types of distributor reception devices provided in respective distributors have been used. Further, the magnetic stripe data transmission scheme has higher utility values in the future ultra-short range communication fields.

The POS system being currently used will be described. A POS transmission terminal used in the POS system requires a method for reducing battery power consumption in a portable terminal since a user mainly uses such a portable terminal. That is, since the portable terminal receives a power from a battery having a limited capacity, there is a need for schemes to maximally reduce consumption of current that the portable terminal uses during the POS communication. Further, data transmission efficiency may differ depending on a distance between the portable terminal and the reception terminal. Accordingly, there is a need for schemes to secure the data transmittable distance between the portable terminal and the reception terminal and to increase data transmission efficiency in accordance with the distance. In addition, there is a need for a data transmission method to safely receive data in various types of POS reception terminals.

DISCLOSURE OF INVENTION

Technical Problem

An aspect of the present disclosure provides a device and a method for reducing current consumption during magnetic stripe data transmission.

Another aspect of the present disclosure provides a device and a method for securing a magnetic stripe data transmission distance.

Still another aspect of the present disclosure provides a device and a method for safe magnetic stripe data transmission.

Still another aspect of the present disclosure provides a device and a method for magnetic stripe data transmission enabling various types of reception terminals to receive data without error.

Still another aspect of the present disclosure provides a device and a method capable of increasing transmission efficiency of magnetic strip data.

Still another aspect of the present disclosure provides a device and a method for preventing overcurrent from occurring during data transmission in a device for magnetic stripe data transmission.

Solution to Problem

In one aspect of the present disclosure, a device for magnetic stripe data transmission includes a coil to which current is supplied in a first direction and a second direction that is opposite to the first direction; a core configured to inducing a magnetic field when the current is supplied to the coil; a power source configured to supplying the current to the coil; driving circuits configured to intermittently supply a burst pulse or similar burst pulse current supplied from the power source to the coil in the first direction or the second direction; and a controller configured to output to the driving circuits a control signal for controlling the current to be supplied to the coil alternately in the first direction and the second direction, wherein the core is made of a material having a squareness ratio of 0.5 or more, having a coercivity value of 1000 to 10000 [A/m], and having a semi hard magnetic density having a saturated magnetic flux density value of 1 [T] or more.

In another aspect of the present disclosure, a device for magnetic stripe data transmission includes a coil to which current is supplied in a first direction and a second direction that is opposite to the first direction; a current adjustment circuit configured to adjust, when a burst pulse or similar burst pulse current is supplied to the coil, the current so that the current is gradually attenuated for a predetermined time from a falling edge of the current; a power source configured to supplying the current to the coil; driving circuits configured to intermittently supply the burst pulse or similar burst pulse current supplied from the power source to the coil in the first direction or the second direction; and a controller configured to output to the driving circuits a control signal for controlling the current to be supplied to the coil alternately in the first direction and the second direction, wherein the current adjustment circuit includes a capacitor connected in series to the coil.

In still another aspect of the present disclosure, a device for magnetic stripe data transmission includes a coil to which current is supplied in a first direction and a second direction that is opposite to the first direction; a power source configured to supplying the current to the coil; a current adjustment circuit configured to adjust, when a burst pulse or similar burst pulse current is blocked after being intermittently supplied to the coil, the current so that the current is attenuated and blocked in the form of stairs having a falling edge every second time that is shorter than a predetermined first time from the falling edge of the burst pulse or similar burst pulse current; driving circuits configured to supply the burst pulse or similar burst pulse current intermittently supplied from the power source to the coil in the first direction or the second direction; and a controller configured to output a control signal for controlling the current to be supplied to the coil in the burst pulse or similar burst pulse form alternately in the first direction and the second direction.

In yet still another aspect of the present disclosure, a method for transmitting data in an electronic device having a device for magnetic stripe data transmission includes checking a battery capacity of the electronic device in case where the magnetic stripe data transmission is required; reading a predetermined current adjustment value from a memory corresponding to the battery capacity; transmitting data at a rising edge of intermittently flowing current during the magnetic stripe data transmission; and applying a current attenuation rate in accordance with the current adjustment value read at a falling edge of the intermittently flowing current.

Advantageous Effects of Invention

Using the device and method for magnetic stripe data transmission according to the present disclosure, current consumption can be reduced, a safe data transmission distance can be secured, and data can be received without error in various types of reception terminals. Further, using the device and method for magnetic stripe data transmission, transmission efficiency of the magnetic stripe data can be increased, and overcurrent can be prevented from occurring during data transmission.

BRIEF DESCRIPTION OF DRAWINGS

FIGS. 4A to 4E are timing diagrams between current flowing through a coil of a magnetic stripe data transmission unit and voltages detected by a reception terminal;

MODE FOR THE INVENTION

Figure 1:
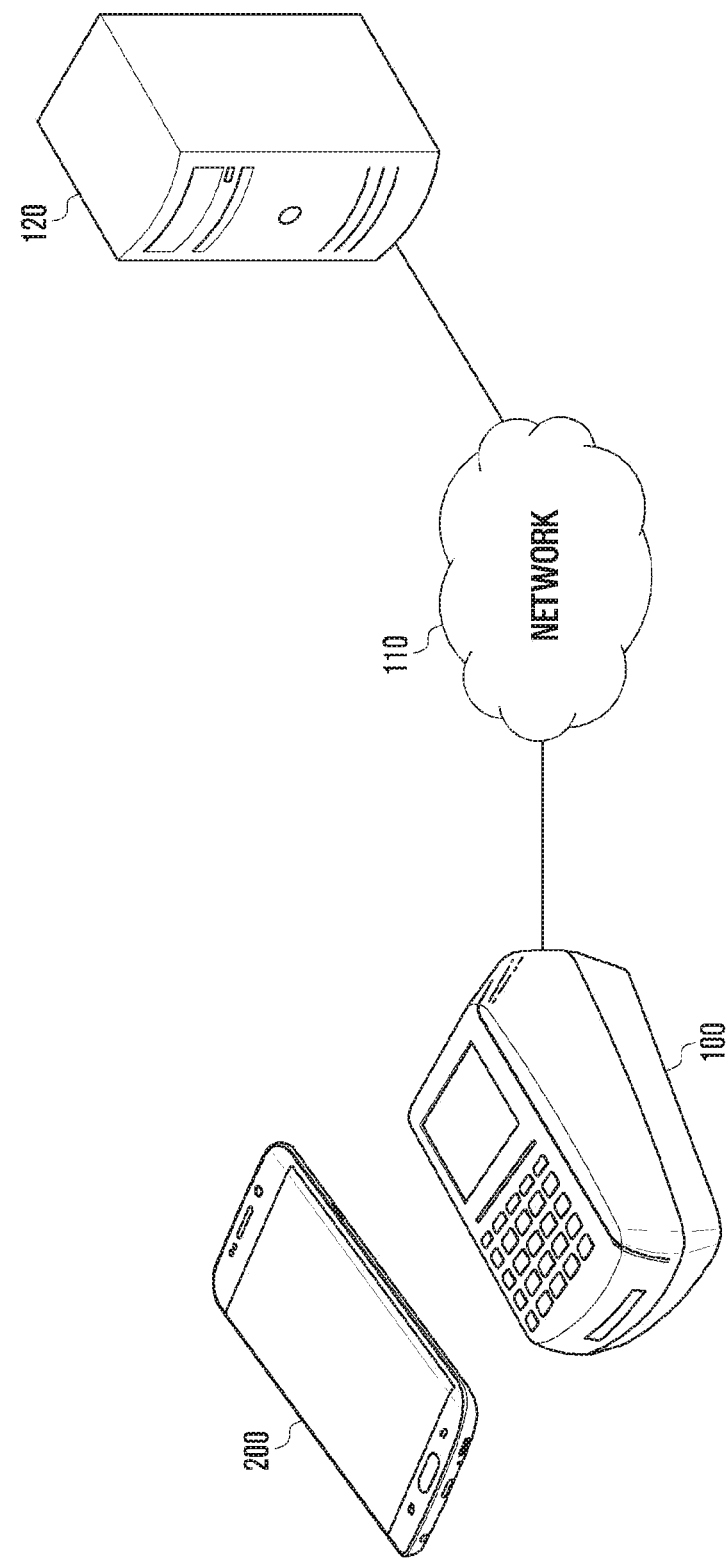
FIG. 1 is an overall conceptual diagram of a POS system to which the present disclosure is applied.

Hereinafter, various embodiments of the present disclosure will be described in detail with reference to the accompanying drawings. It should be noted that the same drawing reference numerals are used for the same elements across various figures. Further, the accompanying drawings are provided to help understanding of the present disclosure, and it should be noted that the present disclosure is not limited to the form or deployment as exemplified in the drawings. Further, in describing the present disclosure, related well-known functions or configurations are not described in detail in the case where it is determined that they obscure the subject matter of the present disclosure. In the following description, explanation will be made only with respect to a portion that is necessary in understanding the operation according to various embodiments of the present disclosure, and explanation of other portions will be omitted not to obscure the subject matter of the present disclosure.

First, a data transmission scheme in a POS system in which magnetic stripe data transmission is mainly used will be described.

FIG. 1 is an overall conceptual diagram of a POS system to which the present disclosure is applied.

Referring to FIG. 1, a point of sale (POS) system includes a transmission terminal 200 and a reception terminal 100. Data obtained by the reception terminal 100 may be provided to a specific server 120 through a network 110. Here, the server 120 may be a product stock server, a server for providing accumulated sales data, a server for billing, or a server including the whole or parts of the above-described functions.

In such a POS system, the reception terminal 100 is a terminal which is generally located in a products distributor and to which a stable power is supplied. In contrast, the transmission terminal 200 is an electronic device carried by a product purchaser. The transmission terminal 200 carried by the product purchaser uses a battery power. Recently, representative electronic devices used as the transmission terminal 200 may be a smart phone, a tablet computer and/or a smart watch. Such portable electronic devices essentially require low-power designs according to the trend of miniaturization.

On the other hand, the reception terminal 100 and the transmission terminal 200 of the POS system use a scheme for transmitting magnetic stripe data to each other. Accordingly, the transmission terminal 200 transmits data using change of magnetic field for data transmission. In this case, the transmission terminal 200 should necessarily generate the change of magnetic field for the data transmission, and may transmit the data at a time of the magnetic field change. The transmission terminal 200 consumes the current to generate the change of the magnetic field, and this may cause reduction of the usage and standby time of the transmission terminal 200 using the battery.

Further, both the transmission terminal 200 and the reception terminal 100 are manufactured in various types through various manufacturers. Accordingly, in accordance with the reception performance of the reception terminal 100, magnetic stripe data transmitted from the transmission terminal 200 may be normally received therein, or malfunction may occur. Accordingly, it is required for the transmission terminal 200 to recognize the data transmitted from the reception terminal 100 safely and accurately. If normal data transmission is not performed, data retransmission should be performed, or unwanted false data may be transmitted due to a data error.

If it is required to perform the data retransmission, the transmission terminal 200 should additionally consume current for the data retransmission, and this causes the transmission terminal 200 using the battery to waste the available power. Further, if the data error occurs in the POS system, this may cause severe damage or various inconveniences to a user due to a payment error.

First Embodiment

Hereinafter, a first embodiment of the present disclosure will be described with reference to the accompanying drawings. It is to be noted that respective embodiments as described hereinafter may be separately used one by one, or may be applied to specific products, and different embodiments may be simultaneously applied.

Figure 2:
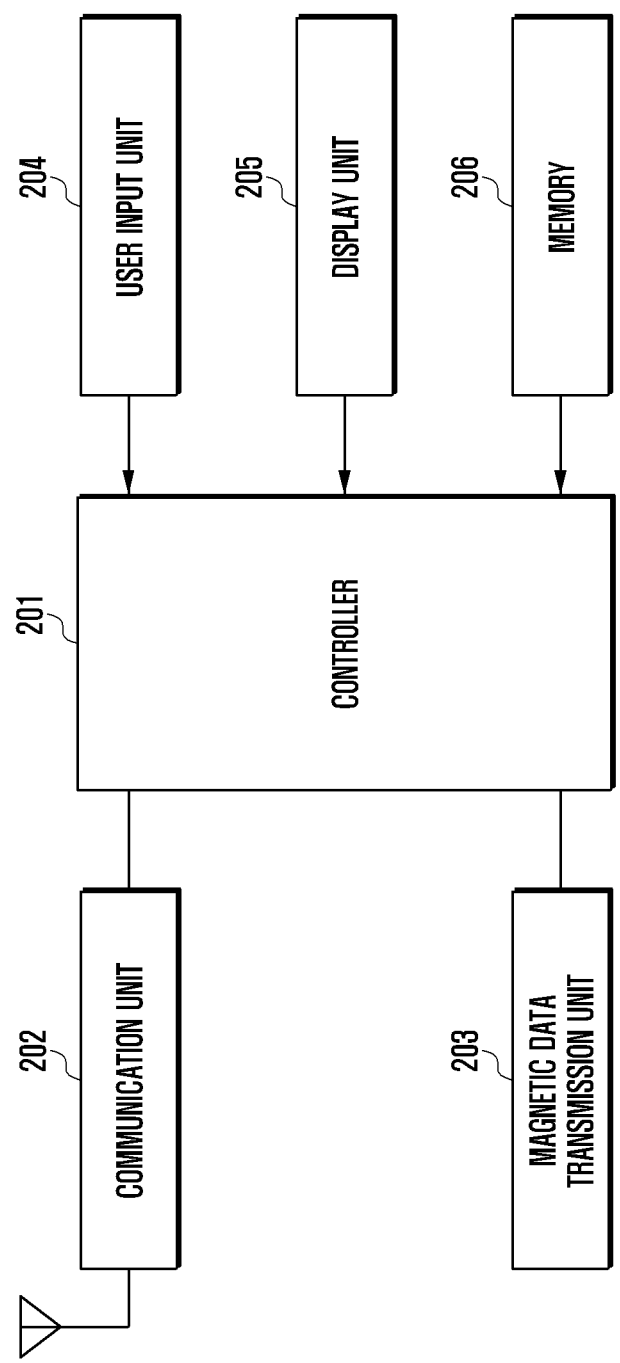
FIG. 2 is a functional block diagram of a transmission terminal to which the present disclosure is applied.

FIG. 2 is a functional block diagram of a transmission terminal to which the present disclosure is applied.

The present disclosure may be applied to various types of transmission terminals, such as smart phones, mobile communication terminals, tablet computers, and smart watches. Hereinafter, the internal configuration of a transmission terminal 200 will be described using the simplified functional block configuration of a smart phone of FIG. 2. However, it is apparent that the present disclosure is not limited to a smart phone, but various types of portable electronic devices using batteries can be used through application of features of the present disclosure to be described hereinafter. Further, even in a specific case where an electronic device that does not use a battery uses a magnetic stripe data transmission technique, the present disclosure to be described hereinafter can be applied thereto. Accordingly, it is to be noted that the present disclosure is not limited to constituent elements of FIG. 2, and the contents of FIG. 2 to be described hereinafter helps understanding of the present disclosure.

Referring to FIG. 2, a controller 201 may control the overall operation of a smart phone. The controller 201 may include, for example, a processor and a modem, or an application processor (AP) and a communication processor (CP). It is to be noted that the controller 201 may be composed of the processor and the modem, or the AP and the CP in a separate manner. In the present disclosure, for convenience in explanation, the controller 201 is merely exemplary, and if needed, various elements may constitute an actual product.

The controller 201 may perform not only the operation of a smart phone, but also control of a magnetic data transmission unit 203 during data transmission. Such control contents will be described in more detail with reference to the drawings to be described later.

A communication unit 202 is configured so that a smart phone performs data transmission and reception through a mobile communication network or a WiFi network. Accordingly, the communication unit 202 may have various types of communicable configurations in the smart phone. Further, if a wired communication scheme is necessary, the communication unit 202 may provide a wired communication interface. In addition, the communication unit 202 may further include configurations for receiving various types of radio signals, such as configuration for receiving a signal from an artificial satellite and configuration for receiving DMB broadcasts.

In the present disclosure, the magnetic data transmission unit 203 may generate magnetic data and provide the generated magnetic data to a POS reception terminal. The configuration of the magnetic data transmission unit 203 according to the present disclosure will be described in more detail with reference to the drawings to be described later.

A user input unit 204 detects user's specific input, such as key input, touch input, voice input, or motion input, and provides a detection signal to the controller 201. The user input unit 204 may include physical keys or a keypad, and in case of adopting a touch screen type, it may be provided as a user interface (UI) type. Further, in case where user's voice is input, the user input unit 204 may include a microphone (not illustrated) for voice input. In addition, in case of detecting a user input through user's motion or gesture, the user input unit 204 may include various types of sensors, such as motion sensor, camera, and geomagnetic sensor.

A display unit 205 may include all types capable of providing the current state of the smart phone and an operation process or procedure to a user through a specific UI to provide an interface between a smart phone and a user. For example, the display unit 205 may include various types capable of providing a user interface to a user, such as LCDs, various types of LEDs, and holograms.

The memory 206 may include a region for storing various kinds of control data required to operate a smart phone and data input by a user, and a region for storing control data for controlling the magnetic data transmission unit 203 according to the present disclosure.

The above-described configuration of the smart phone in FIG. 2 including partial constituent elements will be described. The electronic device, that is, the transmission terminal 200, may include more constituent elements in addition to the above-described configurations, and if needed, it may not include parts of the above-described constituent elements.

Figure 3:
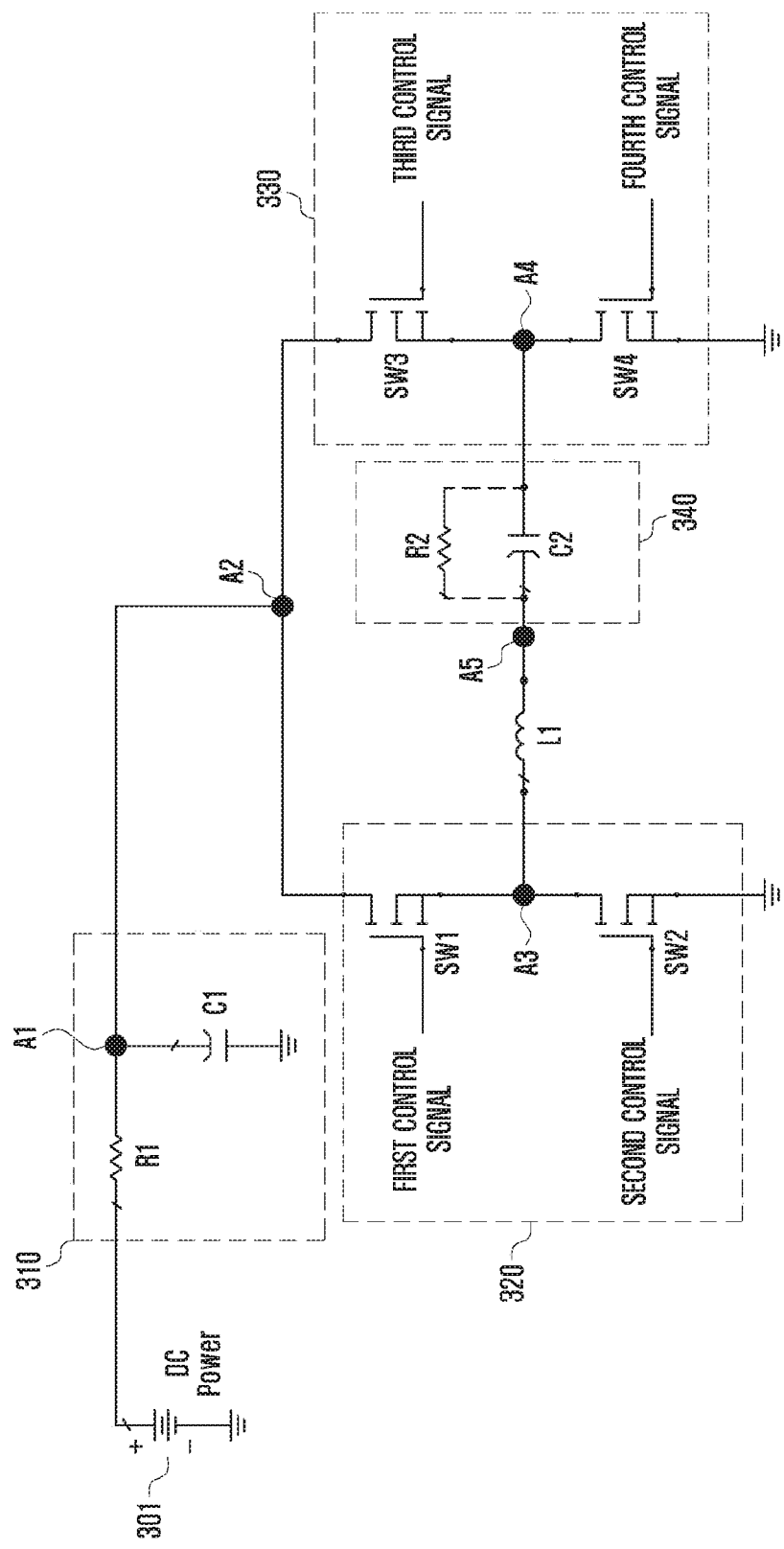
FIG. 3 is a circuit diagram of a magnetic strip data transmission unit according to the present disclosure.

FIG. 3 is a circuit diagram of a magnetic strip data transmission unit according to the present disclosure, The magnetic stripe data transmission unit according to the present disclosure includes a DC power source 301, a low-pass filter 310, a first driving circuit 320, a second driving circuit 330, a current adjustment circuit 340, and a magnetic coil L1.

Referring to FIG. 3, the magnetic stripe data transmission unit according to the present disclosure will be described in more detail.

The DC power source 301 supplies a DC power to the low-pass filter 310. The low-pass filter 310 includes a first resistor R1 connected to the DC power source 301 and a first capacitor C1 connected between the first resistor R1 and ground. A contact A1 between the first resistor R1 and the first capacitor C1 has the same electric potential as that of a second contact A2. Accordingly, the DC power is input to the first driving circuit 320 and the second driving circuit 330 through the first resistor R1 of the low-pass filter 310.

In the second driving circuit 330, a unipolar transistor that serves as a third switch SW3 and a unipolar transistor that serves as a fourth switch SW4 are connected in series through a fourth contact A4, and the other side of the fourth switch SW4 is grounded. Further, a gate terminal that is a third terminal of the third switch SW3 receives a third control signal and controls the switching operation of the third switch SW3, and a gate terminal that is a third terminal of the fourth switch SW4 receives a fourth control signal and controls the switching operation of the fourth switch SW4. As described above, all the first to fourth control signals may be control signals provided from the controller 201 in FIG. 2.

In the second driving circuit 320, a unipolar transistor that serves as a third switch SW3 and a unipolar transistor that serves as a fourth switch SW4 are connected in series through a fourth contact A4, and the other side of the fourth switch SW4 is grounded. Further, a gate terminal that is a third terminal of the third switch SW3 receives a third control signal and controls the switching operation of the third switch SW3, and a gate terminal that is a third terminal of the fourth switch SW4 receives a fourth control signal and controls the switching operation of the fourth switch SW4. As described above, all the first to fourth control signals may be control signals provided from the controller 201 in FIG. 2.

Last, the coil L1 for transmitting the magnetic stripe data is connected between the third contact A3 and the fourth contact A4. In this case, as exemplified in FIG. 3, one side of the coil L1 is directly connected to the third contact A3, and the current adjustment circuit 340 may be provided between the other side of the coil L1 and the fourth contact A4. Further, the coil L1 may be configured by winding a conductor line on a core made of a specific material in various shapes. This will be described in more detail with reference to the drawings to be described later.

As a scheme according to an embodiment of the present disclosure, the current adjustment circuit 340 serves to adjust a slope of a current flow at a transition section of the current induced in the coil L1. The current adjustment circuit may include only a second capacitor C2, or may include a second capacitor C2 and a second resistor R2 connected in parallel. The operation of the current adjustment circuit 340 will be described in more detail with reference to the drawings to be described later.

The operation of the overall circuit as described above will be briefly described. First, if the first control signal is input to turn on the first switch SW1 of the first driving circuit 320, and the second control signal is input to turn off the second switch SW2, the third control signal is input to turn off the third switch SW3 of the second driving circuit 330, and the fourth control signal is input to turn on the fourth switch SW4. If the first driving circuit 320 and the second driving circuit 330 operate as described above, the current supplied from the DC power source 301 flows from the second contact A2 to the first switch SW1 of the first driving circuit 320 through the low-pass filter 310. The current having passed through the first switch SW1 flows to the current adjustment circuit 340 and the fourth switch SW4 of the second driving circuit 330 through the coil L1.

Next, a case where the current flowing through the coil L1 is supplied (flows) in an opposite direction to the direction of the current as described above will be described.

In order for the current to be supplied to the coil L1 in the opposite direction, the first control signal is input to turn off the first switch SW1 of the first driving circuit 320, and the second control signal is input to turn on the second switch SW2. Further, the third control signal is input to turn on the third switch SW3 of the second driving circuit 330, and the fourth control signal is input to turn off the fourth switch SW4. If the respective control signals are input to the first driving circuit 320 and the second driving circuit 330, the current supplied from the DC power source 301 flows from the second contact A2 to the third switch SW3 of the second driving circuit 330 through the low-pass filter 310. The current having passed through the third switch SW3 flows to the second switch SW2 of the first driving circuit 320 through the current adjustment circuit 340 and the coil L1.

FIGS. 4A to 4D are timing diagrams between current flowing through a coil of a magnetic stripe data transmission unit and voltages detected by a reception terminal.

First, referring to FIG. 4A, current may flow in different directions as described above through the coil L1 of the magnetic stripe data transmission unit. For example, current that is supplied to the first driving circuit 320 may flow to ground through the coil L1 and the second driving circuit 330, and current that is supplied to the second driving circuit 330 may flow to ground through the coil L1 and the first driving circuit 320.

Hereinafter, explanation will be made on the assumption that the current that is supplied to the first driving circuit 320 and flows to ground through the coil L1 and the second driving circuit 330 is positive current, and the current that is supplied to the second driving circuit 330 and flows to ground through the coil L1 and the first driving circuit 320 is negative current.

As exemplified in FIG. 4A, while the positive current flows, that is, from time 0 to time t01, the current flows in a positive direction through the coil L1, and in this case, no voltage is detected by the reception terminal 100. That is, if there is no change of current, a magnetic field induced in the coil L1 has a constant value, and in this case, the reception terminal 100 is unable to detect the change of voltage. Accordingly, from time 0 to time t01, no voltage is detected by the reception terminal 100.

In this case, if the current direction is changed from the positive direction to the negative direction, that is, if the direction of the current flowing through the coil L1 is changed from time t01 to time t02, variation of the voltage detected by the reception terminal 100 to the negative direction can be detected. At the time when the voltage change occurs in the reception terminal 100 as described above, the transmission terminal 200 can transmit data to the reception terminal 100.

The same explanation can be made with respect to an opposite case to the above-described case. That is, from time t02 to time t11, a constant current flows in the negative direction through the coil L1. If the fixed current flows continuously as described above, the reception terminal 100 becomes unable to detect the voltage change. This is because the change of an electric field does not occur due to the fixed current flowing through the coil L1. If the current flow is changed from the negative direction to the positive direction in a period from time t11 to time t12, the reception terminal 100 can detect the voltage variation as denoted by a reference numeral 421.

If the current flows continuously in the positive direction or the negative direction as described above, an average amount of current consumption in the transmission terminal 200 becomes very large to almost approximate the amount of current flowing in one direction as denoted by a reference numeral 401.

Figure 4B:
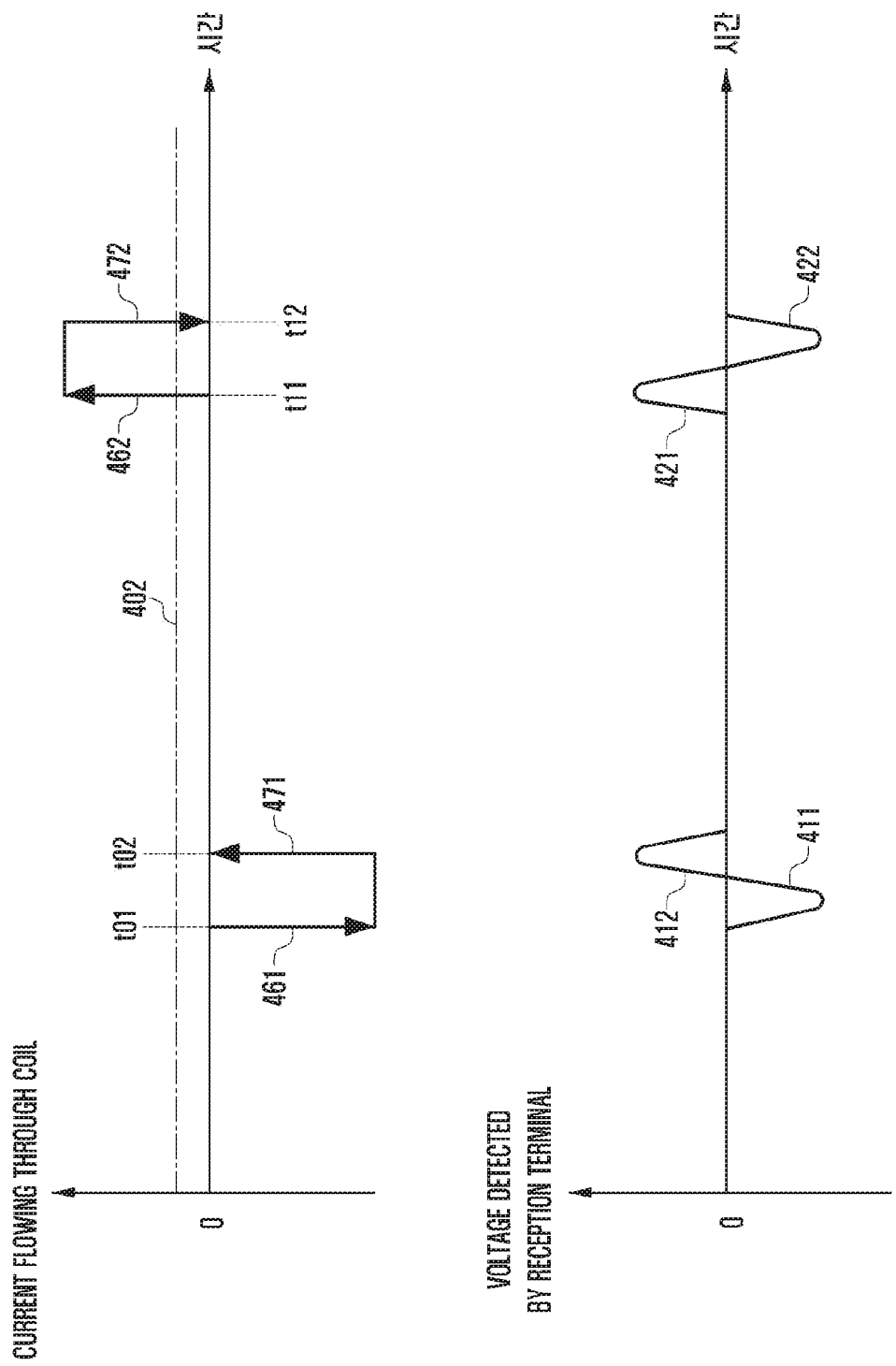

FIG. 4B is a timing diagram between a pulse type current flowing through a coil of a magnetic stripe data transmission unit and a voltage detected by a reception terminal.

Referring to FIG. 4B, it can be identified that consumption of an average current flowing through the coil L1 is greatly reduced in comparison to that as described above with reference to FIG. 4A. FIG. 4B exemplifies reduction of current consumption in the transmission terminal 200 in a manner that a short pulse type (a short burst pulse type) or a similar pulse (a similar burst pulse) (triangle wave, sine wave, or sawtooth wave) type current flows through the coil L1 in the negative direction in a data transmission period measured from time t01 to time t02, and a short pulse type current flows in the positive direction in the next transmission period measured from time t11 to time t12. In this case, referring to FIG. 4A, as compared with FIG. 4B, it can be identified that the current is steadily supplied based on the position where the current becomes "0". In contrast, referring to FIG. 4B, the current flow alternates burst and discontinuously. Here, the term "alternates" means that the current direction is sequentially changed. As a result, in case of adopting FIG. 4B, the average value of current consumption in the transmission terminal 200 becomes very small as denoted by a reference numeral 402. This value corresponds to very low power in comparison to that as illustrated in FIG. 4A.

The current flow type as illustrated in FIG. 4B will be described in more detail. First, if the pulse or similar pulse type current flows through the coil L1 in the negative (−) direction, the current at time t01 has a rising edge at which the current is increased in the negative (−) direction from zero ("0") current that corresponds to no current flow. Further, after the current flows through the coil L1 in the negative (−) direction in a period measured from time t01 to time t02, the current at time t02 has a falling edge at which the current again becomes "0" that corresponds to no current flow. If the current has the rising edge and the falling edge as described above, the reception terminal 100 can detect the current change at the rising edge and the falling edge.

In the following description, the pulse or similar pulse type current means the current flow including the rising edge at which the current is abruptly increased and the falling edge at which the current is abruptly decreased. In other words, at the pulse type rising edge and falling edge having a specific slope, the current flow having the slope that is equal or similar to the slope of the rising edge may appear. For example, the similar pulse may correspond to a triangle wave, sawtooth wave, sine wave, isosceles quadrangle wave, or square wave having a rising edge and a falling edge with different slopes. Hereinafter, for convenience in explanation, both the pulse type current and the similar pulse type current are called pulse type current.

Detection of the current change can be explained in the same manner even in case where a pulse type current flows through the coil L1 in the positive (+) direction. That is, if the pulse type current flows through the coil L1 in the positive (+) direction, the current at time t11 has a rising edge at which the current is increased in the positive (+) direction from zero ("0") current that corresponds to no current flow. Further, after the current flows through the coil L1 in the positive (+) direction in a period measured from time t11 to time t12, the current at time t12 has a falling edge at which the current again becomes "0" that corresponds to no current flow. If the current has the rising edge and the falling edge as described above, the reception terminal 100 can detect the current change at the rising edge and the falling edge.

Through the current flowing through the coil L, the reception terminal 100 detects the voltage change at the rising edge and the falling edge. Referring to FIG. 4B, the reception terminal 100 detects variation of the magnetic field in the negative (−) direction in accordance with the current change as denoted by a reference numeral 411 at the rising edge in the negative (−) direction at time t01. Further, at the falling edge at time t02, the reception terminal 100 detects the variation of the magnetic field in the positive (+) direction as denoted by a reference numeral 412.

As described above, the reception terminal 100 can detect the unwanted type of voltage change as denoted by a reference numeral 412. Hereinafter, the voltage change detected by the reception terminal 100 at the unwanted current falling edge caused by the transmission terminal 200 using the discontinuous pulse current is called an opposite peak. From the viewpoint of the reception terminal 100, such an opposite peak may act as a noise. Accordingly, even in case of providing a pulse type forward current, a desired voltage change 421 and an unwanted opposite peak 422 are detected.

As a result, the average current consumed by the transmission terminal 200 can be reduced as denoted by the reference numeral 402, but in case of using the pulse type, as exemplified in FIG. 4B, an opposite peak voltage value that is recognized as the generated noise as exemplified in FIG. 4B is detected, and thus it may act as an element which deteriorates the reception performance of the reception terminal 100 or which can be discriminated as transmission of the unwanted data.

On the other hand, the amount of current actually flowing through the coil L1 is unable to be changed to a pulse-like type. Actually, it has a somewhat slope. That is, time elapses from time t01 to time t01' (not illustrated) with somewhat elapsed time. Accordingly, such an opposite peak, that is, variation of the voltage detected by the reception terminal 100, may be a value obtained by dividing variation of magnetic flux flowing through the coil L1 of the transmission terminal 200 by time variation. This may be expressed as in mathematical expression 1 below.

$$V_{opp} = \frac{\delta \Phi}{\delta t} \qquad \text{[Mathematical expression 1]}$$

In mathematical expression 1, $V_{opp}$ denotes the level of a voltage detected when an opposite peak is generated in the reception terminal 100, $\delta \Phi$ denotes variation of magnetic flux at a falling edge in the coil L1 of the transmission terminal 200, that is, variation of magnetic flux from time t02 to time t02', and $\delta t$ denotes variation of time at a falling edge in the coil L1 of the transmission terminal 200, that is, time measured from time t02 to time t02'. Further, although only the opposite peak is explained in mathematical expression 1 as described above, a desired type of peak, that is, voltage variation at a data transmission time, can also be explained in the same manner. The variation of magnetic flux explained in mathematical expression 1 will be described in more detail with reference to the drawings to be described later.

In an embodiment of the present disclosure, as exemplified in FIG. 3, a scheme for reducing an unwanted opposite peak through the current adjustment circuit 340 may be provided. As exemplified in FIG. 3, if the current adjustment circuit 340 is provided, the actual current flow and the voltage change detected in the reception terminal 100 may appear as illustrated in FIG. 4C.

Referring to FIG. 4C, in case of adding the current adjustment circuit 340 using a second capacitor C2 and a second resistor connected in parallel to the second capacitor, the current flowing through the coil L1 of the magnetic stripe data transmission unit 203 shows a flow as denoted by reference numerals 441a to 441c in case of the opposite current, whereas it shows a flow as denoted by reference numerals 442a to 442c in case of the forward current. Here, the attenuation of the current flowing through the coil L1 can be changed by yawing at least one of the second resistor R2 value and the second capacitor C2 value. For example, a case where the second capacitor C2 value is varied will be described.

If the second capacitor C2 has a predetermined maximum value, it has the graph 441c, whereas if the second capacitor C2 has a predetermined minimum value, it has the graph 441a. Further, if the second capacitor C2 has an intermediate value between the maximum value and the minimum value, it has the graph 441b. In this case, if the second capacitor C2 has the maximum value, that is, if it has the graph 441c, the power variation detected by the reception terminal 100 may become minimum.

It is to be noted that, for convenience in explanation, a case where the voltage variation detected by the reception terminal 100 has the graphs 441b and 442b in which the second capacitor C2 has the intermediate value of the current flowing through the coil L1 in the transmission terminal 200 is not illustrated in FIG. 4C.

FIG. 4C exemplifies a case where the second capacitor C2 has three different values. Referring to FIG. 4C, if the value of the second capacitor C2 of the current adjustment circuit 430 is adjusted, there may be different time points where the current flowing through the coil L1 becomes "0". For example, if the second capacitor C2 has the minimum value, the current flowing through the coil L1 flows as indicated by the reference numeral 441a, and the time when the current becomes "0" is time t02_a, whereas if the second capacitor C2 has the intermediate value, the current flowing through the coil L1 flows as indicated by the reference numeral 441b, and the time when the current becomes "0" is time t02_b. Further, if the second capacitor C2 has the maximum value, the current flowing through the coil L1 flows as indicated by the reference numeral 441c, and the time when the current becomes "0" is time t02_c. Among three cases, if the second capacitor C2 has the minimum value, the minimum power is consumed, and if the second capacitor C2 has the intermediate value, the intermediate power is consumed. Further, if the second capacitor C2 has the maximum value, the maximum power is consumed. However, this value may be a very small value as compared with that as illustrated in FIG. 4A as described above.

Accordingly, the overall power consumption of the transmission terminal 200 may have a similar value to the value of the power consumption as exemplified in FIG. 4B, and an average power consumption may be changed in accordance with the second capacitor C2 value. In FIG. 4C, the power consumed by the transmission terminal 200 is exemplified by the reference numeral 403 on the assumption that the second capacitor C2 value is the intermediate value.

More specifically, if the opposite current flows through the coil L1 of the magnetic stripe data transmission unit, that is, at time t01, the reception terminal 100 detects the variation of the voltage induced in the coil L1 in accordance with the current change, and thus it is possible to detect the normal voltage as indicated by reference numeral 411, that is, it is possible to detect the voltage that is necessary during the data transmission. Further, since the current is slowly decreased as compared with the case of FIG. 4B as described above, the opposite peak can be configured so that sufficiently low voltage not to cause the malfunction occurrence as indicated by reference numeral 413a or 414c can be detected. Further, as exemplified in the drawing, prevention of the malfunction has a lower value as the second capacitor C2 value becomes larger. Accordingly, in case where the second capacitor C2 has the largest value as indicated by 441c, rather than in case where the second capacitor C2 has the smallest value as indicated by 411a, the case of the corresponding opposite peak 413c can perform safer operation.

In the same manner, at time t11 when the forward current flows through the coil L1 of the magnetic stripe data transmission unit, the voltage detected by the reception terminal 100 may be the normal voltage, that is, the voltage necessary during the data transmission. Even in this case, as described above, since the slope is determined in accordance with the second capacitor C2 value and thus the current is gradually decreased, the opposite peak may be configured so that sufficiently low voltage not to cause the malfunction occurrence as indicated by reference numeral 423a or 423c can be detected.

Further, the current adjustment circuit 340 according to the present disclosure may be composed of the second capacitor C2 only. In this case, reduction of the current flow may be lowered in comparison to the case exemplified in FIG. 4C, but by properly adjusting the second capacitor C2 value, it is possible to detect the opposite peak to the extent that the malfunction does not occur in the reception terminal 100. Further, by properly adjusting the values of the second capacitor C2 and the second resistor R2, the time t02 can be changed. As described above, by properly adjusting the values of the second capacitor C2 and the second resistor R2, the current reduction can be adjusted so that the opposite peak detected by the reception terminal 100 has the level recognized as a general noise.

On the other hand, the second capacitor C2 value may be determined in accordance with the characteristic of a product during manufacturing of the product, or it may be configured that current flows through one of a plurality of different capacitors connected in parallel to each other. Further, the capacitor value may be adjusted using a variable capacitor. However, in case where the current adjustment circuit 340 has a plurality of capacitors according to the present disclosure, the capacitor value may be adjusted in consideration of the battery capacity of the electronic device and the battery charging state. This will be described in more detail with reference to flowcharts to be described later.

As another method, instead of providing the current adjustment circuit 340 in the form as exemplified in FIG. 3, a digital current adjustment circuit may replace the current adjustment circuit 340. In case of configuring such a digital current adjustment circuit, it is required that an additional fifth control signal for adjusting the current reduction amount is provided from the controller 201 whenever the voltage change occurs. Now, referring to FIG. 4D, a method for adjusting the amount of current flowing through the coil L1 in the form of stairs according to another embodiment of the present disclosure will be described.

Referring to FIG. 4D, at a time when data transmission is necessary, that is, at time t01, the current that is provided from the DC power source 301 and flows through the coil L1 in the negative (−) direction is provided in a pulse type to match the data transmission time, and after being maintained for a predetermined time, the current is gradually decreased in the form of stairs up to time t03. That is, the current flowing through the coil L1 at time t03 becomes "0". In this case, the current amount is reduced to the extent that the reception terminal 100 is unable to detect the opposite peak or recognizes the opposite peak as a general noise (very low opposite peak), and thus the reception terminal 100 does not detect the opposite peak or detects the opposite peak as a noise in the form as indicated by reference numeral 414. Further, in case of adjusting the current attenuation, if the time measured from t01 to t03 is set to a first time, the current maintenance time in the first time may be a second time. In this case, the second time may be set to a long or short time. If the second time is set to be long, the first time may be longer than the second time. Further, if the second time is lengthened in a state where the first time is fixed, current attenuation width should be further increased. For example, in case where the first time is fixed and the second time is lengthened, the current drop width, that is, the reduction width of the amount of the current flowing through the coil L1, can be adjusted. In addition, while the first time is adjusted in accordance with the second time, the current change width can be simultaneously adjusted in all. Accordingly, if it is assumed that the time measured from the peak current to no current flow is the first time, the current amount is reduced in the unit of the second time that is shorter than the first time, and by varying the amount (width) of the reduced current, it is possible to adjust the time until the current is blocked in the form of stairs and the overall current amount being consumed.

Further, the current adjustment circuit 340 that makes the current flowing through the coil L1 have the shape as illustrated in FIG. 4D may be located in a place that is not exemplified in FIG. 3. For example, the current adjustment circuit 340 may be configured to directly control the DC power source 301 or to be located at an output terminal provided from the DC power source 301. Further, the current adjustment circuit 340 may be configured to be located at a second contact A2. In case of making the current flowing through the coil L1 descend in the form of stairs, the location of the current adjustment circuit 340 is a kind of design choice, and thus additional explanation thereof will be omitted.

In case of gradually reducing the current flow induced in the coil L1 of the magnetic data transmission unit in the form of stairs through the current adjustment circuit 340, the voltage waveform detected by the reception terminal 100 includes a section in which there is no variation for the time measured from the time when the initial current is induced to the time when the change is made. Accordingly, the reception terminal 100 can detect the variation of the opposite voltage as indicated by reference numeral 414 or 424 after a slight time delay after detection of desired peaks 411 or 421.

In this case, by adjusting the variation of the current being reduced, the reception terminal 100 can make the voltage change to the extent that the detection amount of the opposite peak voltage value does not cause malfunction. Accordingly, in case of FIG. 4D, as compared with FIG. 4C, the current change may be made up to the time t03 that is longer than the time t02. This may be the time for preventing an abrupt current change during the current change in the form of stairs. Accordingly, in case of FIG. 4D, as compared with the case as illustrated in FIG. 4C, the transmission terminal 200 consumes a larger amount of current than that in case of FIG. 4C. As exemplified by reference numeral 404 in FIG. 4D, it can be identified that an average current consumption is increased in comparison to that as illustrated in FIG. 4C. Further, as described above with reference to FIG. 4C, even in case of FIG. 4D, average current variations may have different slopes. This will be described in more detail with reference to FIG. 4E.

Figure 4E:
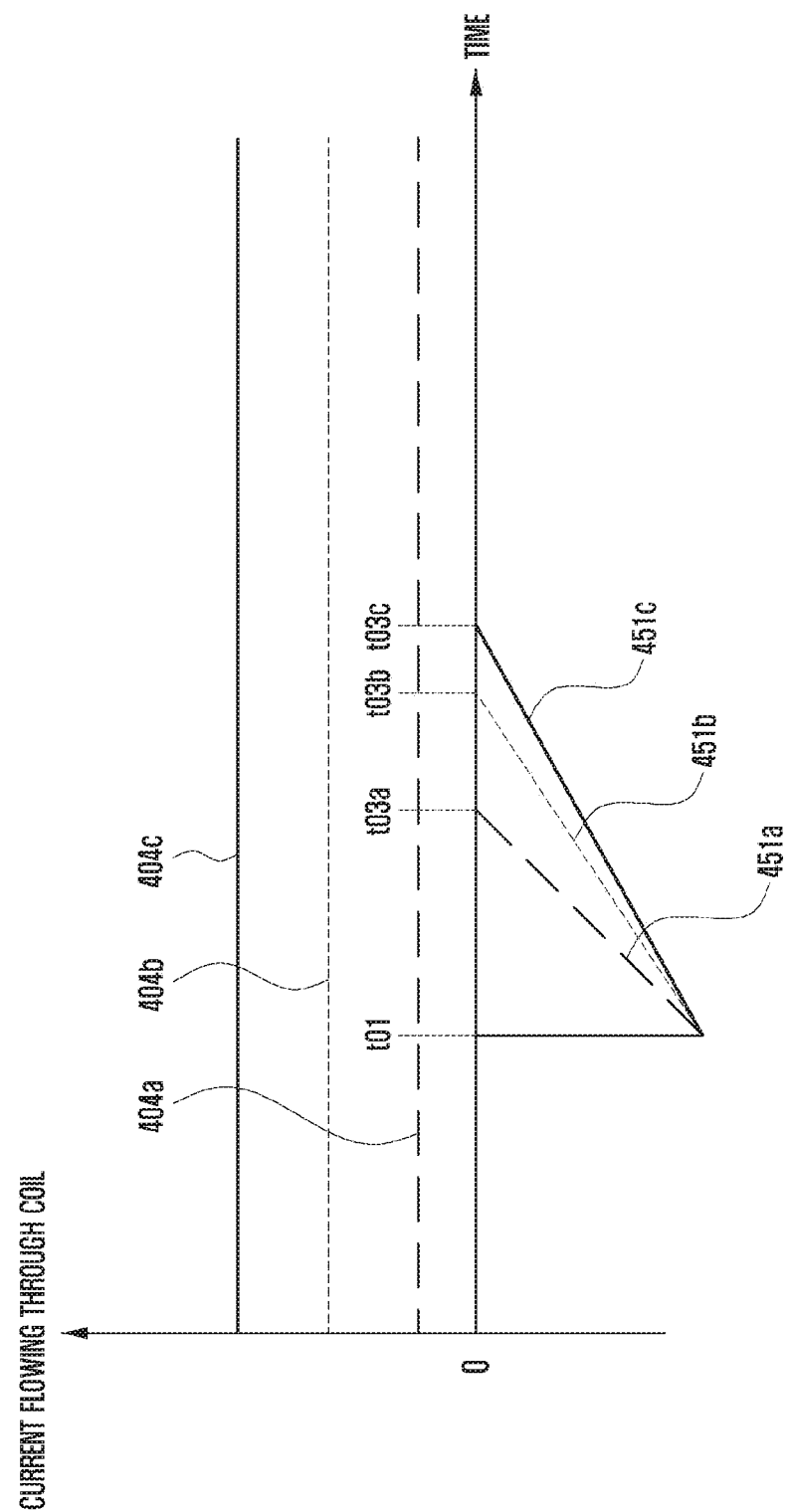

FIG. 4E is a timing diagram in case of adjusting the time and the current amount flowing through the coil of the magnetic data transmission unit of the electronic device according to the present disclosure.

Although FIG. 4E exemplifies only a case where the current flowing through the coil L1 of the magnetic data transmission unit flows in the negative (−) direction, it will be apparent to those skilled in the art that it is also possible to apply the same even in case where the current flows in the positive (+) direction.

Referring to FIG. 4E illustrating a graph exemplifying an average current in case where the current flowing through the coil L1 of the magnetic data transmission unit is reduced in the form of stairs as illustrated in FIG. 4D in the negative (−) direction.

In FIG. 4E, reference numeral 451a denotes a case having the smallest current consumption, and in this case, in the transmission device 200, peak current flows in the negative (−) direction at time t01, and thereafter no current flows through gradual reduction of the current until time t03a. Accordingly, in the transmission device 200, the power consumption may have a small value as indicated by reference numeral 404a Further, reference numeral 451b denotes a case of intermediate current consumption among three kinds of examples, and in this case, in the transmission device 200, peak current flows in the negative (−) direction at time t01, and thereafter no current flows through gradual reduction of the current until time t03b. Accordingly, in the transmission device 200, the power consumption may have an intermediate value as indicated by reference numeral 404b. Last, reference numeral 451c denotes a case having the largest current consumption, and in this case, in the transmission device 200, peak current flows in the negative (−) direction at time t01, and thereafter no current flows through gradual reduction of the current until time t03c. Accordingly, in the transmission device 200, the power consumption may have a large value as indicated by reference numeral 404c.

As the power consumption becomes larger, the opposite peak becomes lower in the reception device 100 as described above with reference to FIG. 4C. Further, if the current reduction amount per hour becomes smaller, the transmission device 200 has a larger current consumption value, but the reception device has a lower opposite peak. Accordingly, even in case of having different slopes as described above, as described above with reference to FIG. 4C, the current variation can be controlled in different forms in accordance with the battery residual amount of the transmission device 200 or the battery capacity of the transmission device 200. This will be described in more detail with reference to control flowcharts to be described later.

Comparing the above-described cases of FIGS. 4B to 4E with that of FIG. 4A, the transmission terminal can reduce the power consumption in the cases of FIGS. 4C to 4E. Further, in case of FIGS. 4C to 4E corresponding to embodiments of the present disclosure, as compared with FIG. 4B, safe data transmission can be performed by changing the variation of the current flowing through the coil L1 of the magnetic stripe data transmission unit to a value enough to prevent malfunction due to the opposite peak voltage value through the reception terminal 100.

Figure 5A:
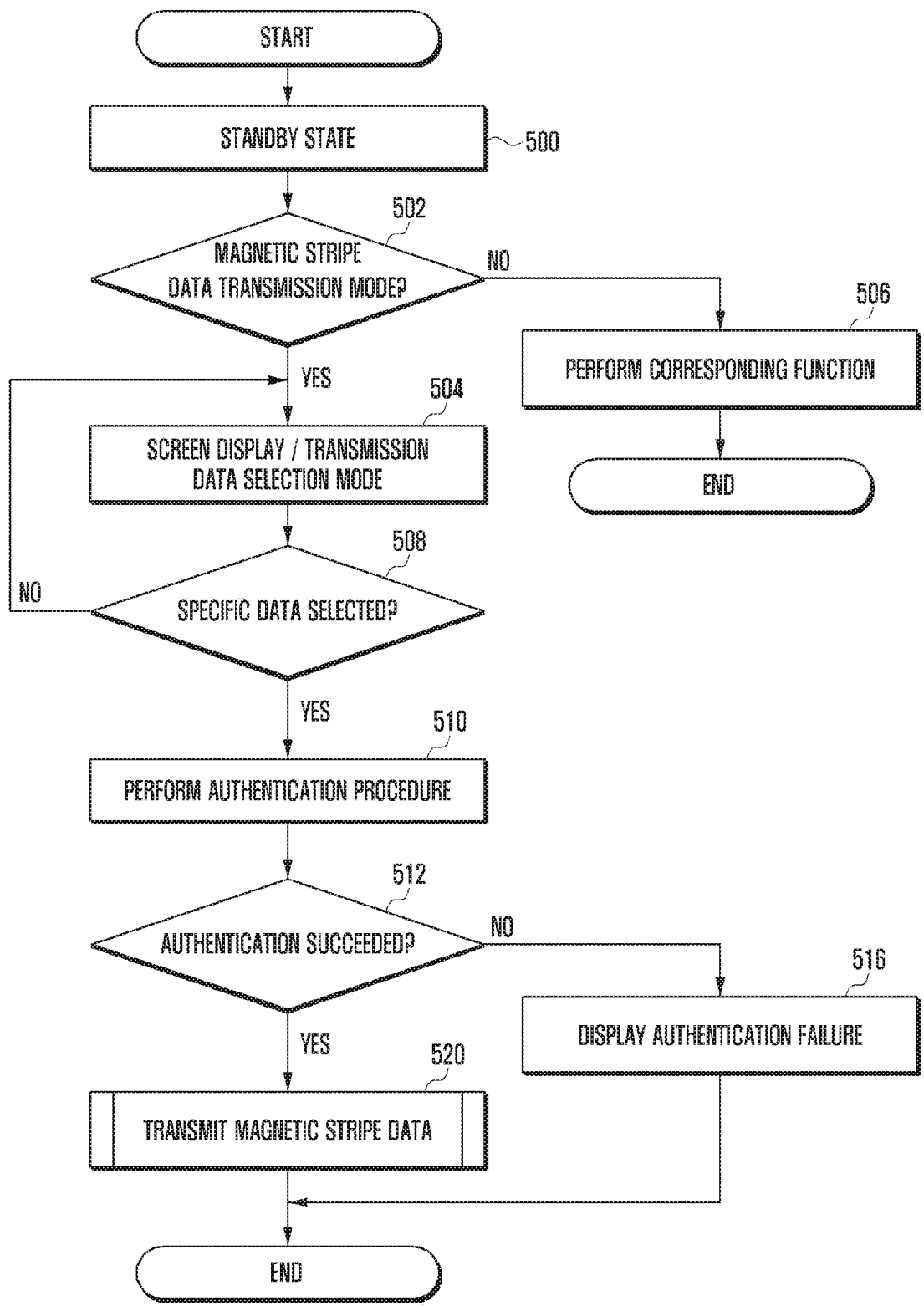
FIGS. 5A and 5B are control flowcharts in case where a transmission terminal transmits magnetic stripe data according to the present disclosure.

FIG. 5A is a control flowchart in case where a transmission terminal transmits magnetic stripe data according to the present disclosure. Hereinafter, referring to FIG. 5A, a control flow during magnetic stripe data transmission according to the present disclosure will be described.

At operation 500, the controller 201 maintains a standby state. In such a standby state, the electronic device may wait for a specific event, for example, specific input from a user or signal transmission and reception from wired/wireless network. If a specific event occurs, the controller 201 proceeds with operation 502 to check whether a magnetic stripe data transmission mode is requested. For example, in case of a POS system, operation 502 may be an operation in which a user checks whether a request for electronic payment, such as card payment, has been received using a portable electronic device, such as a smart phone or a smart watch.

In case of an event requesting switchover to the magnetic stripe data transmission mode as the result of the checking at operation 502, the controller 201 proceeds with operation 504, and if the event is not to request the switchover to the magnetic stripe data transmission mode, the controller 201 proceeds with operation 506 to perform the function corresponding to the event, and may end the routine.

In case of proceeding with operation 504, the controller 201 controls the display unit 105 to display a screen, and waits for reception of data to be transmitted. On the assumption of the POS system, the controller 201 may control the display unit 105 to display at least one card that can be selected by a user, and may be in a standby state in which the controller 201 waits for selection of a specific card or a screen switchover signal input from the user input unit 104. If a specific signal is input from the user input unit 104, the controller 201 proceeds with operation 508 to check whether the input signal is a signal for selecting specific data. For example, operation 508 may be an operation of checking whether the signal received from the user input unit 104 is a signal for selecting a specific card or data requiring the magnetic stripe data transmission. If a specific data selection signal is input as the result of the checking at operation 508, the controller 201 proceeds with operation 510, whereas if the input signal is not the specific data selection signal, the controller 201 proceeds with operation 504 to continue the mode for screen display and reception of the selection of the data to be transmitted.

Thereafter, if specific data is selected at operation 508, the controller 201 proceeds with operation 510 to perform an authentication procedure. Generally, in case of the card payment, user authentication is a very important and essential element. Accordingly, in this case, the authentication operation at operation 510 may be performed. However, if transmission of the magnetic stripe data is simply required other than the card payment, operations 510, 512, and 516 may be unnecessary operations.

In the authentication procedure at operation 510, a user may input a specific password or user's bio-information through the user input unit 104. The authentication procedure can be performed through comparison of the input information with pre-stored information. Thereafter, the controller 201 may proceed with operation 512 to check whether the authentication has succeeded as the result of performing the authentication procedure. If the authentication has succeeded, the controller may proceed with operation 520 to perform the magnetic stripe data transmission. The magnetic stripe data transmission may be performed in the method as described above with reference to FIGS. 4C to 4E using the configuration of FIG. 3 as described above. This will be described in more detail with reference to FIG. 5B.

In contrast, if the authentication has failed, the controller 201 may proceed with operation 516 to display the authentication failure on the display unit 105, and may end the corresponding routine or may request re-authentication. It is to be noted that FIGS. 5A and 5B exemplify only a case of ending the corresponding routine for convenience in explanation.

Figure 5B:
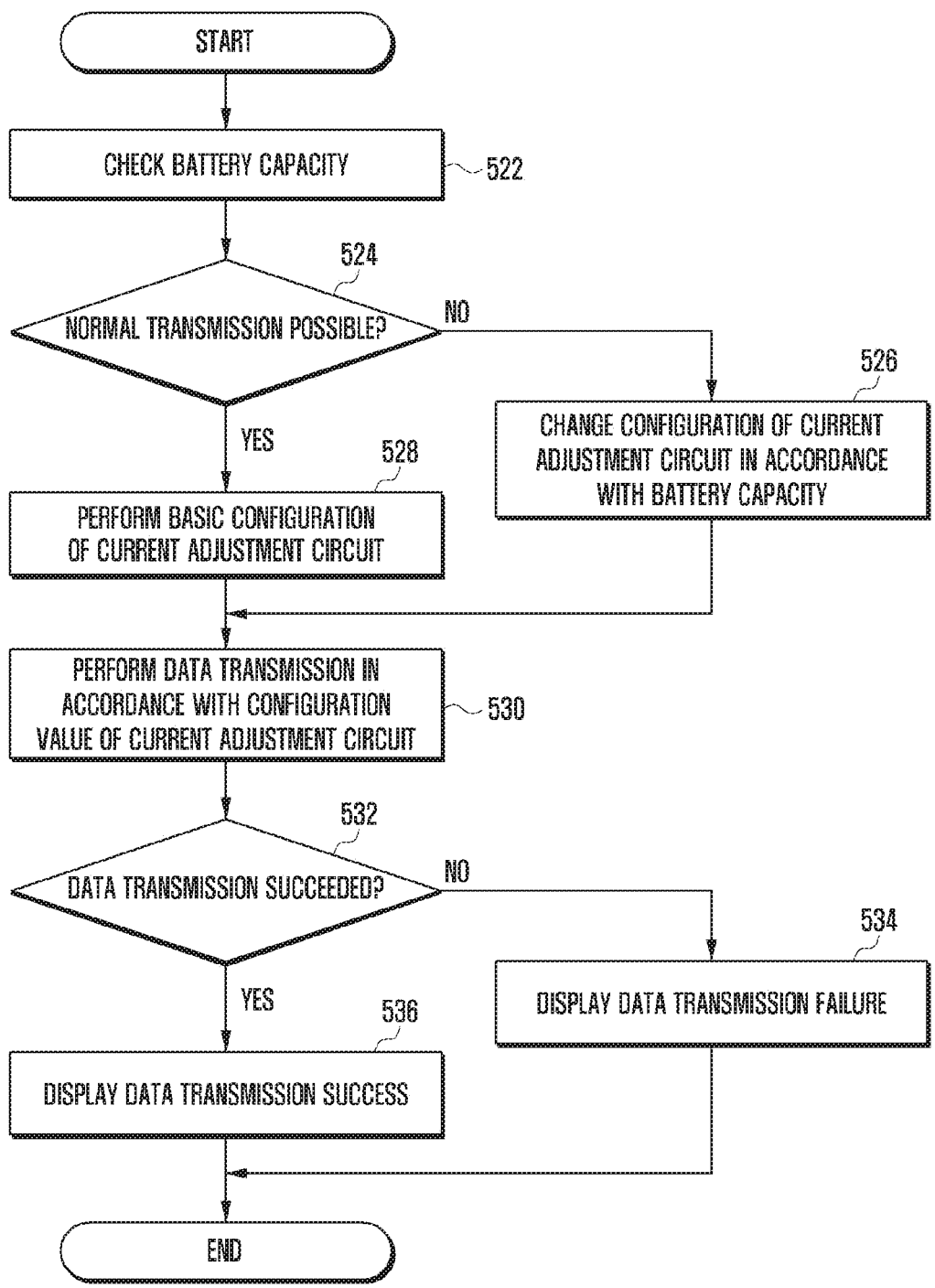

FIG. 5B is a control flowchart in case where an electronic device transmits magnetic stripe data according to an embodiment of the present disclosure.

In case of proceeding with the magnetic data transmission mode, the controller 201, at operation 522, may check the battery capacity. Checking the battery capacity may be checking of whether the battery is in a low power state, for example, whether the current residual battery capacity is 15% or less, 10% or less, or 5% or less, or checking of whether to use a high-capacity battery having the total battery capacity of 2150 [mAh] or 2600 [mAh] or a low-capacity battery having the total battery capacity of 250 [mAh] or 300 [mAh]. Such reference values may be configured based on information pre-stored in the memory 206.

For example, if the battery capacity is 1000 [mAh] or more, the battery may be determined as a high-capacity battery, whereas if the battery capacity is less than 1000 [mAh], the battery may be determined as a low-capacity battery. Further, if the residual battery capacity is 15% or less, a low-power state may be set, whereas if the residual battery capacity exceeds 15%, a normal state may be set. Further, if the residual battery power is less than 5%, an ultra-power saving state may be set.

As described above, an operation of checking the total battery capacity and residual power may be operation 522. Further, since the total battery capacity may be preset, it may be a value pre-recognized by the controller 201. Accordingly, in case of pre-recognizing the total battery capacity, the controller 201, at operation 522, may perform only the operation of checking the residual battery power.

Thereafter, at operation 524, the controller 201 checks whether a normal transmission is possible. If the normal transmission is possible, the controller 201 proceeds with operation 528 to set the current adjustment circuit 340 as basic setup. In contrast, if the normal transmission is not possible, the controller 201 may proceed with operation 526 to change the setup of the current adjustment circuit in accordance with the battery capacity.

Here, the term "normal transmission is possible" means a case where the residual power in the battery of the transmission device 200 is sufficient. Accordingly, referring to FIGS. 4C to 4E as described above, the current adjustment circuit 340 may configure a case where the current consumption amount is largest. In case of the largest current consumption amount, the reception device 100 may detect the lowest opposite peak. As a result, at operations 524, 526, and 528, the current adjustment circuit 340 is controlled to determine whether to consume the maximum current, the minimum current, or the intermediate current through the coil L1.

The above-described method will be exemplarily described with detailed numerical values. For example, if the residual battery power is 15% or more, it is possible to control to consume the maximum current, and if the residual battery power is in the range of 5% to 15%, it is possible to consume the intermediate current. Further, if the residual battery power is less than 5%, it is possible to control to consume the minimum current.

Accordingly, in the memory 206, if the residual battery power is equal to or larger than a first threshold value, at least one of the second capacitor value for configuring the current adjustment circuit 340, path information on what capacitor is to be selected among a plurality of capacitors included in the current adjustment circuit 340, and a current descending slope value during digital current adjustment can be configured. Such a mapping example may be exemplified in Table 1 below.

TABLE 1

| Battery capacity | Current adjustment circuit control |
| --- | --- |
| Less than 5% | Ultra power saving current path (Minimum current consumption path) |
| More than 5% and less than 15% | Power saving current consumption path |
| More than 15% | Maximum current consumption path |

In Table 1, the ultra-power saving current path may be, for example, a case indicated by reference numeral 441a or 442a as described above with reference to FIG. 4C. Further, if the current adjustment circuit 340 includes three capacitors connected in parallel to each other and having different values, the current may be supplied to the coil L1 through the capacitor having the minimum value. As another example, if the current adjustment circuit 340 is composed of a variable capacitor, the variable capacitor may be set to the minimum value. As still another example, in case of adjusting the current in the form of stairs as illustrated in FIGS. 4D and 4E, the current may become "0" at the earliest time.

In the same manner, if the current adjustment circuit 340 is composed of three capacitors having different values and connected in parallel to each other, the power saving current consumption path may correspond to a case where the current is supplied to the coil L1 through the capacitor having the intermediate value. As another example, if the current adjustment circuit 340 is composed of the variable capacitor, the variable capacitor may be set to a specific value that is larger than the minimum value and is smaller than the maximum value. As still another example, in case of adjusting the current in the form of stairs as illustrated in FIGS. 4D and 4E, the current may become "0" at time t03b as indicated by reference numeral 451b.

Last, if the current adjustment circuit 340 is composed of three capacitors having different values and connected in parallel to each other, the maximum current consumption path may correspond to a case where the current is supplied to the coil L1 through the capacitor having the maximum value. As another example, if the current adjustment circuit 340 is composed of the variable capacitor, the variable capacitor may be set to the maximum value. As still another example, in case of adjusting the current in the form of stairs as illustrated in FIGS. 4D and 4E, the current may become "0" at time t03c as indicated by reference numeral 451c.

If the controller 201 proceeds with operation 530 after changing the configuration value of the current adjustment circuit in accordance with the battery capacity at operation 526 or 528, the controller 201 may perform the magnetic stripe data transmission in accordance with the configuration value of the current adjustment circuit. If the transmission of the magnetic stripe data is completed, the controller 201 may proceed with operation 532 to check whether the data transmission has succeeded. If the data transmission has succeeded, the controller 201 may proceed with operation 536 to display data transmission success (in case of the POS system, payment success) on the display unit 205, whereas if the data transmission has failed, the controller 201 may proceed with operation 534 to display data transmission failure (in case of the POS system, payment failure) on the display unit 205.

Further, it is to be noted that operations 532, 534, and 536 may not be included in accordance with the data transmission system. That is, in case of adopting a scheme not to receive a response to the result of the data transmission, operations 532, 534, and 536 may be unnecessary operations.

Second Embodiment

Hereinafter, a second embodiment of the present disclosure will be described. In the second embodiment of the present disclosure, the configuration and the operation of the low-pass filter 310 as exemplified in FIG. 3 will be described.

The low-pass filter 310 may be composed of a first resistor R1 and a first capacitor C1. As exemplified in FIG. 3, the low-pass filter 310 is designed to pass a low band signal with respect to the DC power supplied from the DC power source 301. That is, by adjusting the impedance value of the first resistor R1 and the first capacitor C1, the high-frequency component of the current provided from the DC power source 301 can be removed. The high-frequency component is to prevent the current having a high peak value from being abruptly supplied.

As described above, the low-pass filter 310 may be located between the DC power source 301 and the first and second driving circuits 320 and 330. As a result, the low-pass filter is configured to remove the high frequency component of the current flowing through the coil L1 used to transmit the magnetic stripe data. That is, the low-pass filter 310 can block the high peak value, that is, the high frequency component, and thus the current consumption can be reduced and the circuit safety can be heightened.

In general, the transmission terminal 200 is a portable terminal as described above, and uses a battery as a power source. In this case, the power that can be supplied from the battery may be limited. For example, a cellular phone, a smart phone, or a wearable device having a smaller size, for example, a smart watch, generally has a battery having a very small size and capacity. If a large amount of current for magnetic stripe data transmission flows abruptly to such transmission devices, other circuits may be damaged, the function of the electronic device itself may deteriorate due to high current flow, or the power of the electronic device may be cut off. In addition, abrupt increase of the current amount may act as an impact against the battery, and this may cause damage of the battery.

In order to prevent this, according to the present disclosure, it is necessary to properly limit the amount of current supplied to the power source and the respective driving units 220 and 230 so that only the current having a predetermined value or less can be supplied. Accordingly, in the present disclosure, by limiting the amount of current using the low-pass filter 310, various kinds of problems that may be caused in the transmission device can be solved. Further, through this, malfunction of other constituent elements of the transmission device 100, for example, the display unit 205 and the controller 201, due to abrupt decrease of the current amount can be prevented from occurring during the magnetic stripe data transmission.

Third Embodiment

Hereinafter, the coil L1 according to the present disclosure, the shape of the core on which the coil is wired, and methods for inducing electric field and magnetic field in accordance with the properties of the coil L1 and the core will be described.

Prior to explanation of the present disclosure, various types of materials exist in the natural world. Further, great many materials artificially processed by humans, such as alloys, also exist. Such materials may be discriminated in accordance with their magnetism. There exist materials having no magnetism, materials having semi-permanent magnetism under specific condition, and materials having instantaneous magnetism only under specific condition.

In general, if current flows around a metal, the metal has magnetism, and there are materials having the characteristic to lose the magnetism abruptly or gradually if the current does not flow thereto. This phenomenon may occur in the metal and other materials that may have the magnetism.

First, a case where a material that can have the magnetism is magnetized will be described with reference to FIGS. 5A and 5B. In the following description, a material that can have the magnetism is called a magnetic material.

Figure 6A:
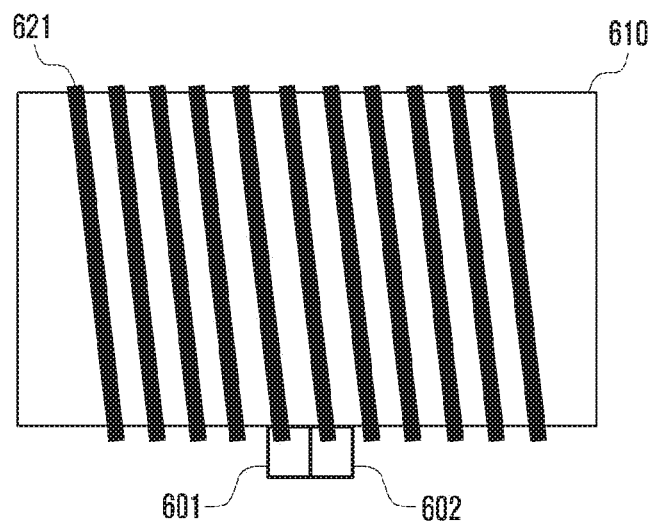
FIGS. 6A and 6B are diagrams exemplifying a method for magnetizing a magnetic material.
Figure 6B:
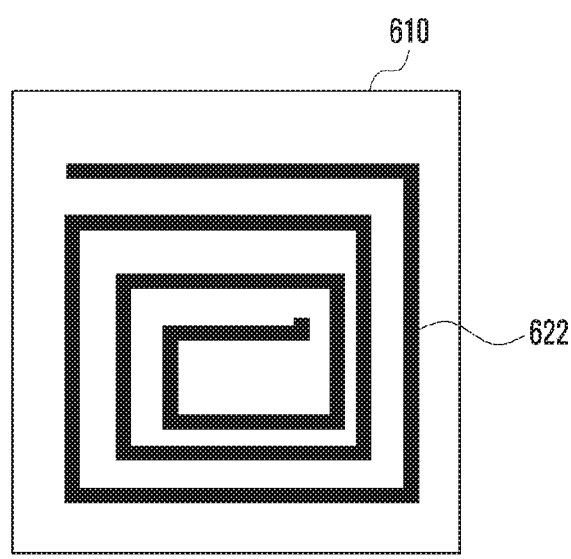

FIGS. 6A and 6B are diagrams exemplifying a method for magnetization of a magnetic material.

Referring to FIG. 6A, reference numeral 610 denotes a core on which a coil is wired, and the core is made of a magnetic material. The shape of the core exemplified in FIG. 6A is a very basic shape, and the core may have a simple shape, such as a rectangular prism shape or a cylinder shape. If a conductive line 621 is wired around a magnetic material having the above-described shape in a spiral shape, and current is supplied thereto through current supply units 601 and 602, the core 610 has magnetism in accordance with variation of the current. Further, as exemplified in FIG. 6B, if the core made of a magnetic material is in the shape of a square prism or a thin square slice having a low height, the coil capable of supplying the current is slice-bonded onto the core in the form of an angled screw, a circular screw, or a spire. In this case, if the current flows through both ends of the coils, the core 610 that is made of a magnetic material has the magnetism in accordance with the variation of the current. Once the magnetic material has the magnetism, it maintains the magnetism for a predetermined time, and in the present disclosure, the magnetic material is discriminated into three types in accordance with the magnetism maintenance level.

Figure 7:
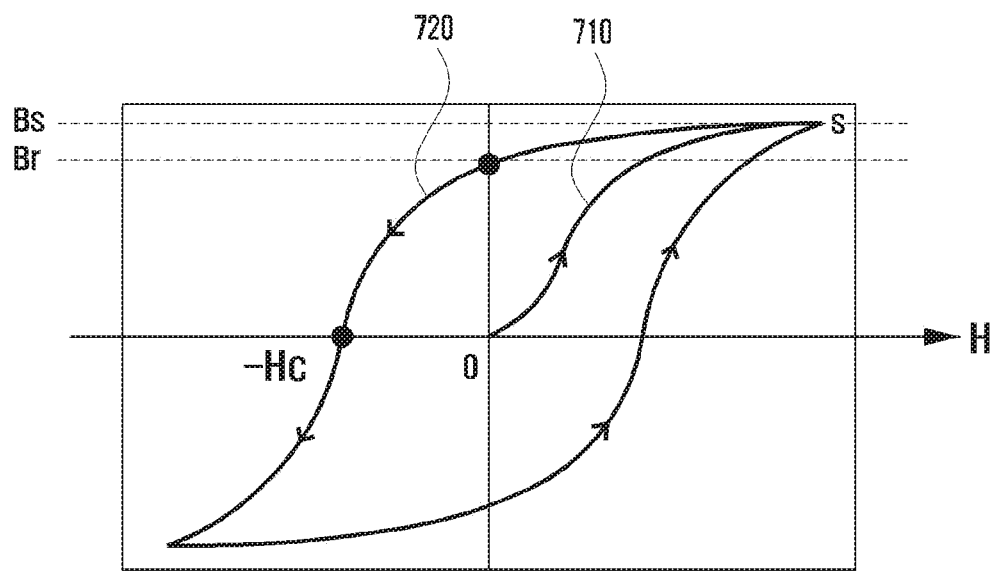
FIG. 7 is a graph of a magnetic hysteresis curve of a magnetic material configuring a core.

FIG. 7 is a graph of a magnetic hysteresis curve of a magnetic material configuring a core.

Referring to FIG. 7 that is a graph of a magnetic hysteresis curve, the relationship between a remnant (or residual) magnetic flux density (Br), coercivity (Hc), and a saturated magnetic flux density (Bs) will be described.

In FIG. 7, a horizontal axis represents a numerical value of a magnetizing force of the magnetic material forming a core, and a vertical axis represents a residual magnetic flux density of the magnetic material. Before an initial power is input, the magnetic material forming the core has the residual magnetic flux density value of "0" and the coercivity value of "0". That is, the magnetic material has no magnetism.

In this case, if the current flows through a line or a coil configured as in FIGS. 6A and 6B, the magnetic material 610 gradually has the magnetism in proportion to the current amount, and the magnetic flux density is heightened. In this case, if the magnetic flux density is heightened up to the saturated magnetic flux density (Bs), the magnetic flux density is not increased any more. That is, if the current is increased, the magnetic flux density is gradually increased until it reaches the saturated magnetic flux density (Bs) as shown in the graph indicated by reference numeral 710.

If the current is decreased or an opposite current is applied after the core, that is, the magnetic material 610 reaches the saturated magnetic flux density (Bs), the magnetic material gradually loses the magnetism. In this case, a graph having a different shape from the shape of the graph that can be generally expected is drawn. That is, the curve in case where the core has no magnetism is a curve in the form as indicated by reference numeral 710. However, if the current is reduced or removed, or an opposite current is applied, the core, that is, the magnetic material 610 has different slopes in accordance with the magnetic materials, but has a graph of a different shape from the shape of the graph during the magnetization as indicated by reference numeral 720 to lose the magnetism.

For example, if the current is supplied to a specific core in a specific direction and then is gradually reduced, the magnetic field is changed due to the current flow in a manner that if the current becomes "0", the magnetic field is not formed. However, if the current flows using the magnetic material 610 as the core, the core itself has a constant residual magnetic flux density (Br) value as shown in FIG. 7 due to the magnetic characteristic of the core itself even if the current becomes "0". The residual magnetic flux density value differs in accordance with the characteristic of the magnetic material.

As described above, the residual magnetic flux density (Br) has different values in accordance with the characteristic of the magnetic material 610, and in order to make the residual magnetic flux density of the core "0", the core may be left in the air for a long time, or a specific electric field may be induced in an opposite direction to make the residual magnetic flux density "0". The opposite magnetic field, that is, the current amount to flow in an opposite direction, which is required to make the residual magnetic flux density of the magnetic material "0" becomes the coercivity value (Hc) of the magnetic material forming the core.

Accordingly, in order to make the residual magnetic flux density (Br) "0", it is required to supply the opposite magnetic field to the magnetic material, and thus the graph illustrating the change of the residual magnetic flux density in accordance with the size of the opposite magnetic field that is applied until the residual magnetic flux density (Br) becomes "0" from the saturated magnetic flux density (Bs) becomes the graph having the shape as indicated by reference numeral 720. Thereafter, if the magnetic field is continuously supplied, that is, the current is supplied in the opposite direction, so that the magnetic material has the magnetic characteristic in the opposite direction again, the magnetic material can be magnetized until it has the saturated magnetic flux density (Bs) in the opposite direction. Further, in an opposite case, the same operation is performed.

As described above, the magnetic characteristic graph having the graph in the shape as described above is called anisotropy. According to the anisotropy, as the coercivity value (Hc) and the residual magnetic flux density have larger values, the material has a better magnetic characteristic, and as the coercivity value (Hc) and the residual magnetic flux density have smaller values, the material has a worse magnetic characteristic.

Further, as a value representing the characteristic of the magnetic material, a squareness ratio value is used in addition to the coercivity value. The squareness ratio value is calculated using the residual magnetic flux density and saturated magnetic flux density values, and the calculation method is the same as "residual magnetic flux density (Br)/saturated magnetic flux density (Bs)".

In the present disclosure, the magnetic material is discriminated into three types in accordance with the squareness ratio and the coercivity. The first material is a hard magnetic material, the second material is a semi hard magnetic material, and the third material is a soft magnetic material. A representative example of the hard magnetic material is a permanent magnet. Further, the semi hard magnetic material is a material used as a burglarproof label or an AM label. Last, the soft magnetic material may correspond to electronic device materials generally used for NFC, WPT, and MST.

The present disclosure proposes a scheme for providing a method capable of heightening transmission efficiency of the magnetic strip data and increasing cognitive faculty using the semi hard magnetic material and the soft magnetic material. Prior to the explanation of the present disclosure, the semi hard magnetic material will be first defined and then explained.

The hard magnetic material used for the permanent magnet may be materials, such as alnico alloys and manganese-bismuth (MnBi) alloys, and has high anisotropy. That is, a material having a large coercivity value becomes a hard magnetic material. Further, in the present disclosure, the semi hard magnetic material and the soft magnetic material are used. The soft magnetic material is a material having a very small coercivity value, such as Fe—Si alloys, amorphous material, nano-crystal, or perm alloy. On the other hand, the semi hard magnetic material may be $BaFe_{1-x}Ti_xO_{19}$, FeNiAlTi alloys, or CoFeV alloys.

The semi hard magnetic material according to the present disclosure may be a material that satisfies all the following conditions.

<Condition>

First, the squareness ratio is 0.5 or more.

Second, the coercivity value is 1000 to 10000 [A/m].

Third, the saturated magnetic flux density value is 1 [T] or more.

Materials satisfying at least one of the above-described conditions are defined as similar hard magnetic materials.

The soft magnetic material according to the present disclosure may be a material satisfying all the following conditions.

<Condition>

First, the coercivity value is 10 to 1000 [A/m].

Second, the saturated magnetic flux density value is 1.5 [T] or more.

Materials satisfying at least one of the above-described conditions are defined as semi hard magnetic materials.

FIGS. 8A to 8I are exemplary diagrams for configuring a core using a semi hard magnetic material and a soft magnetic material.

A method for configuring a core using the semi hard magnetic material and the soft magnetic material as described above will be described using FIGS. 8A to 8I.

Figure 8A:
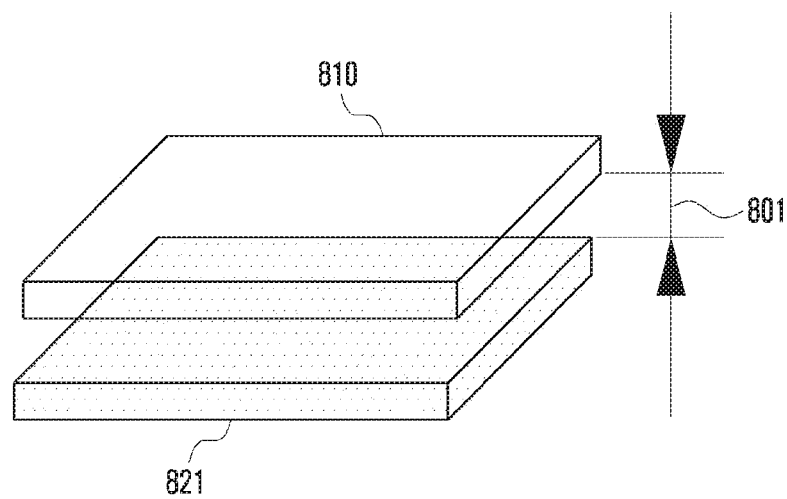
FIGS. 8A to 8I are exemplary diagrams in case of configuring a core using a semi hard magnetic material and a soft magnetic material.

First, referring to FIG. 8A, a first core 810 made of a semi hard magnetic material and a second core 821 made of a soft magnetic material are laminated. In this case, a gap 801 between the first core 810 made of the semi hard magnetic material and the second core 821 made of the soft magnetic material may be a distance value in which a magnetic field can perform organic interaction between the first core 810 and the second core 821, for example, a value within 1 mm. Further, it is configured that any material excluding air is not contained in the gap 801 between the first core 810 made of the semi hard magnetic material and the second core 821 made of the soft magnetic material. Accordingly, the semi hard magnetic material 810 and the soft magnetic material 821 may be actually in a bonded state.

Next, referring to FIG. 8C, another embodiment will be described. FIG. 8C corresponds to an extended bonded state of FIG. 8A. That is, the first core 810 made of the semi hard magnetic material may be laminated at an upper end of the second core 821 made of the soft magnetic material, and a third core 822 made of a soft magnetic material may be laminated at an upper end of the first core 810 made of the semi hard magnetic material. In this case, the second core 821 and the third core 822 may be made of the same material or different materials. However, it is enough that the second core 821 and the third core 822 are cores having the soft magnetic material characteristics. Further, the gap between the first core 810 and the second core 821 and the gap between the first core 810 and the third core 822 should maintain the same gap value, and should not contain any material excluding air.

In the following description, all shapes in which materials having different characteristics, that is, the semi hard magnetic material and the soft magnetic material, form one core are generally called "interaction 2-magnetism characteristic core".

Figure 8B:
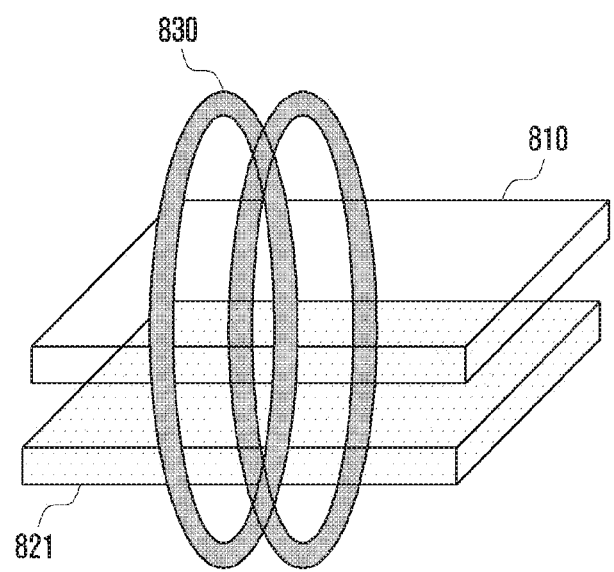
Figure 8C:
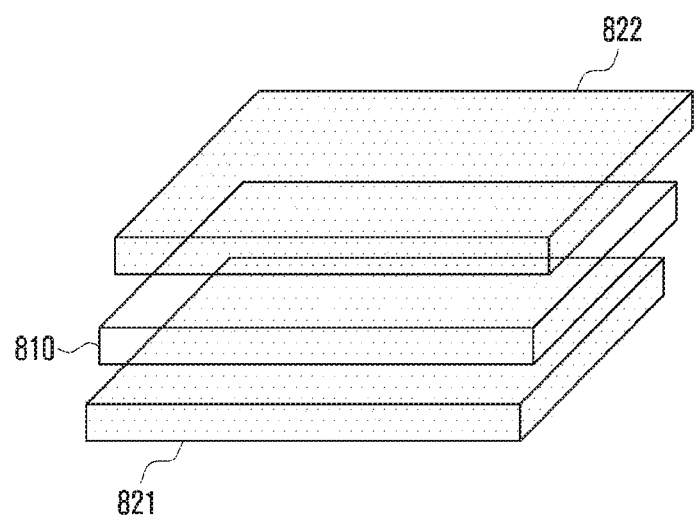
Figure 8D:
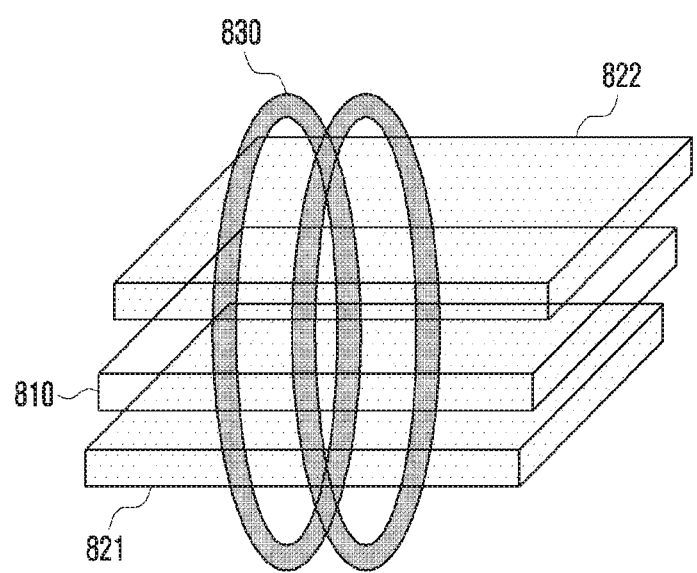

FIG. 8B is an exemplary diagram illustrating a case where a coil 830 is wired in a helical manner on the interaction 2-magnetism characteristic core as shown in FIG. 8A, and FIG. 8D is an exemplary diagram illustrating a case where a coil 830 is wired in a helical manner on the interaction 2-magnetism characteristic core as shown in FIG. 8C. In case of wiring the coil 830 in a helical manner on the interaction 2-magnetism characteristic core as described above, an important point is that the coil is wired on a portion including a bonding part or the coil is wired on the semi hard magnetic portion only.

Now, referring to FIGS. 8E to 8I, various types of embodiments will be described.

Figure 8E:
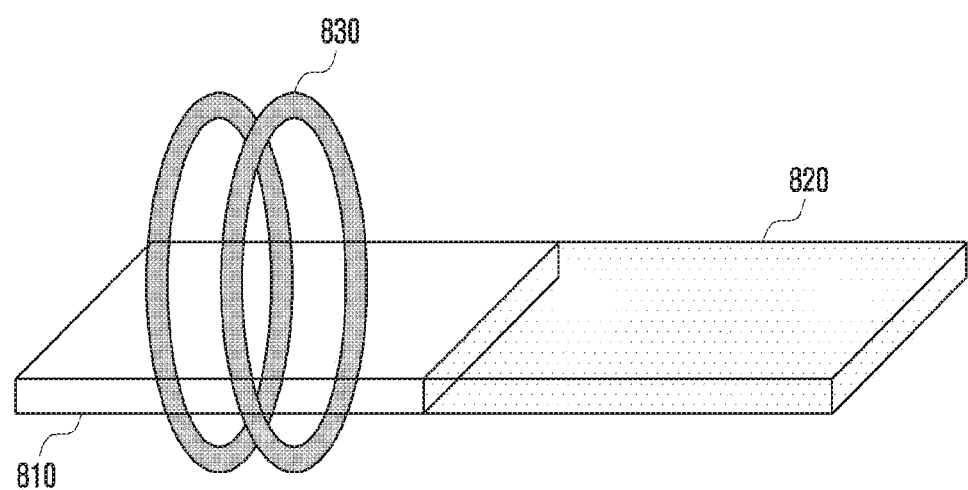

Referring to FIG. 8E, if the first core 810 made of the semi hard magnetic material is configured in a flat plate type and the second core 820 made of the soft magnetic material is also configured in a flat plate type, it is exemplified that the first core 810 and the second core 820 are connected in series to each other. If the first core 810 and the second core 820 are connected in series, as described above, the gap between the first core 810 and the second core 820 should maintain the distance in which organic interaction of the magnetic field becomes possible. Further, as described above, of the first core 810 and the second core 820, the coil 830 may be configured to be wired only on the first core 810 made of the semi hard magnetic material, or may be configured to be wired between the two bonding parts.

Figure 8F:
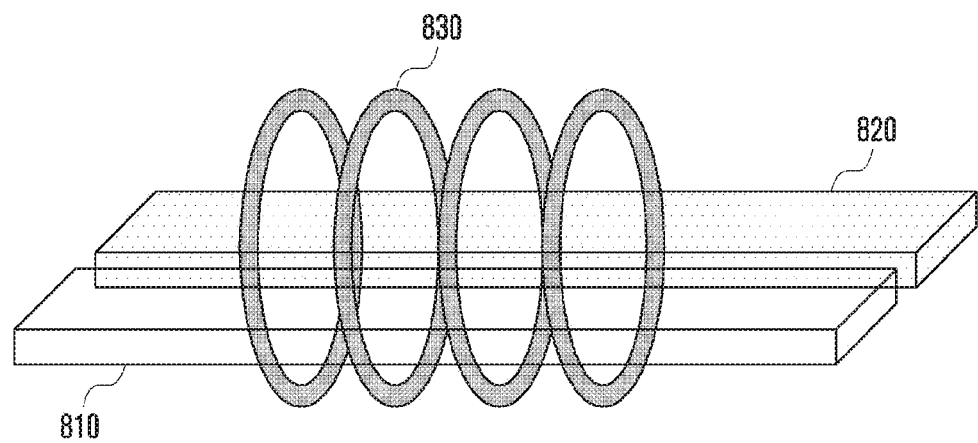

Referring to FIG. 8F, if the first core 810 made of the semi hard magnetic material is configured in a flat plate type and the second core 820 made of the soft magnetic material is also configured in a flat plate type, it is exemplified that the first core 810 and the second core 820 are connected in parallel to each other. If the first core 810 and the second core 820 are connected in parallel, as described above, the gap between the first core 810 and the second core 820 should maintain the distance in which organic interaction of the magnetic field becomes possible. Further, since the first core 810 and the second core 820 are connected in parallel to each other, the coil 830 is wired on a region on which the first core 810 and the second core 820 are bonded together.

Figure 8G:
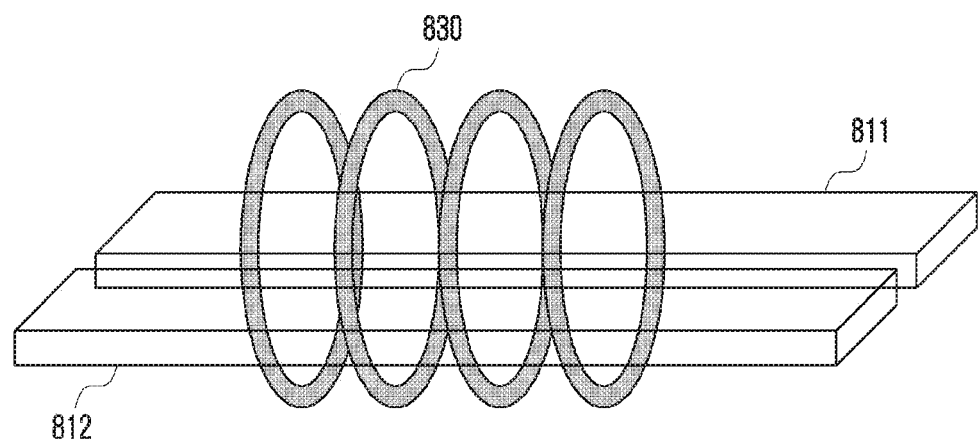

Next, referring to FIG. 8G, it is exemplified that the first core 811 made of a semi hard magnetic material and the second core 812 made of a semi hard magnetic material are connected in parallel to each other in a flat plate type. In this case, the first core 811 and the second core 812 may be made of the same material or different materials. In this case, the gap between the first core 811 and the second core 812 should maintain the distance in which organic interaction of the magnetic field becomes possible. Further, since the first core 811 and the second core 812 are connected in parallel to each other, the coil 830 should be wired on a region on which the first core 811 and the second core 812 are bonded together.

Figure 8H:
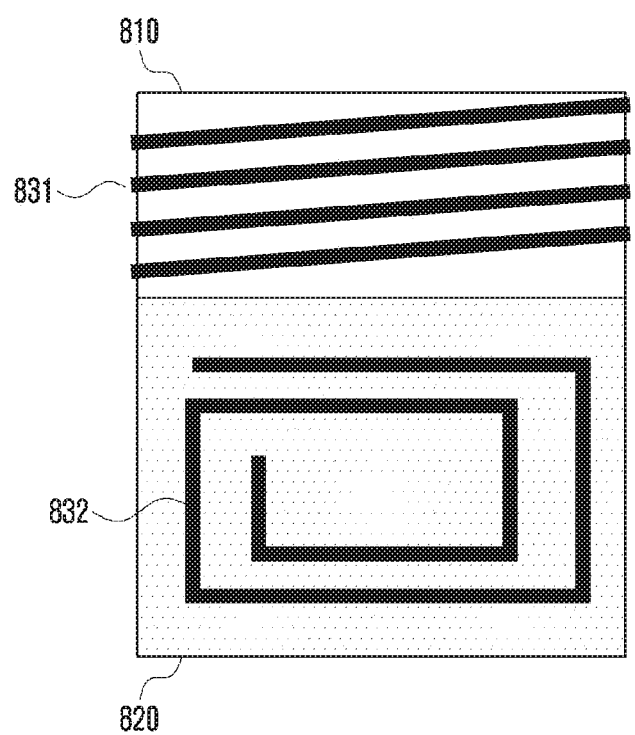

FIG. 8H exemplifies another shape according to the present disclosure. Referring to FIG. 8H, the first core 810 made of the semi hard magnetic material may be in the shape of a cylinder, a rectangular prism, or a slice, and the second core 820 made of a soft magnetic material may be in the shape of a rectangular prism or a slice. In this case, a second coil 832 slice-bonded in a screw shape or an angled or circular spire shape may be included inside the second core 820. Further, it is exemplified that the first core 810 is wired on an outside of the first core 810 in a screw shape. Further, as described above, the gap between the first core 810 and the second core 820 should maintain the distance in which organic interaction of the magnetic field becomes possible.

Figure 8I:
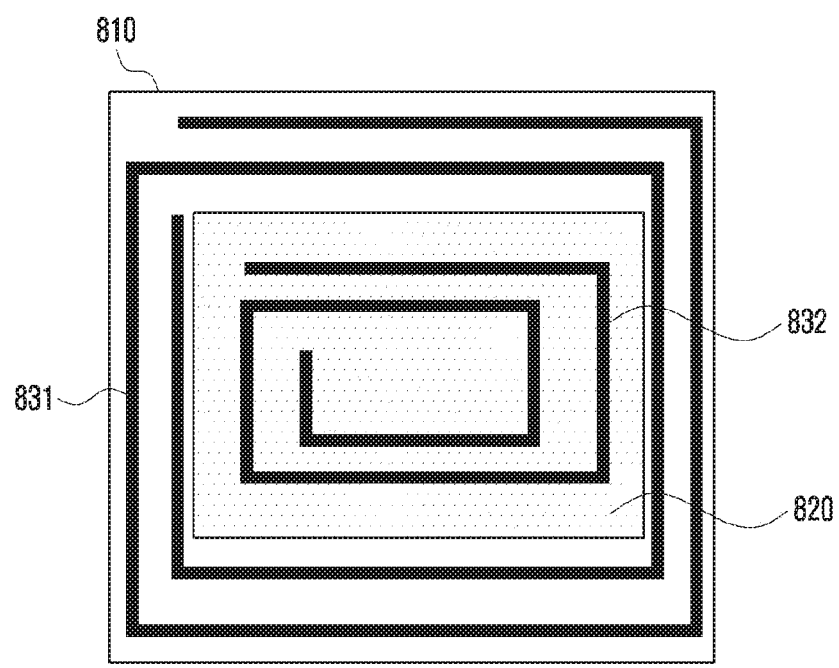

Referring to FIG. 8I, the first core 810 made of a semi hard magnetic material may be in the shape of a rectangular prism or a slice, and the second core 820 made of a soft magnetic material may be in the shape of a rectangular prism or a slice (thin piece). As exemplified in FIG. 8I, the second core 820 made of a soft magnetic material is located only inside the first core 810 made of a semi hard magnetic material. Even in case of such a structure, as described above, the gap between the first core 810 and the second core 820 should maintain the distance in which organic interaction of the magnetic field becomes possible.

In addition, referring to FIG. 8I, the first coil 831 slice-bonded in a screw type or in an angled spiral type may be included only on one side surface of the first core 810, and the second coil 832 slice-bonded in a screw type or in an angled spiral type may be included only on one side surface of the second core 832 that is the same as that of the first core.

Figure 9:
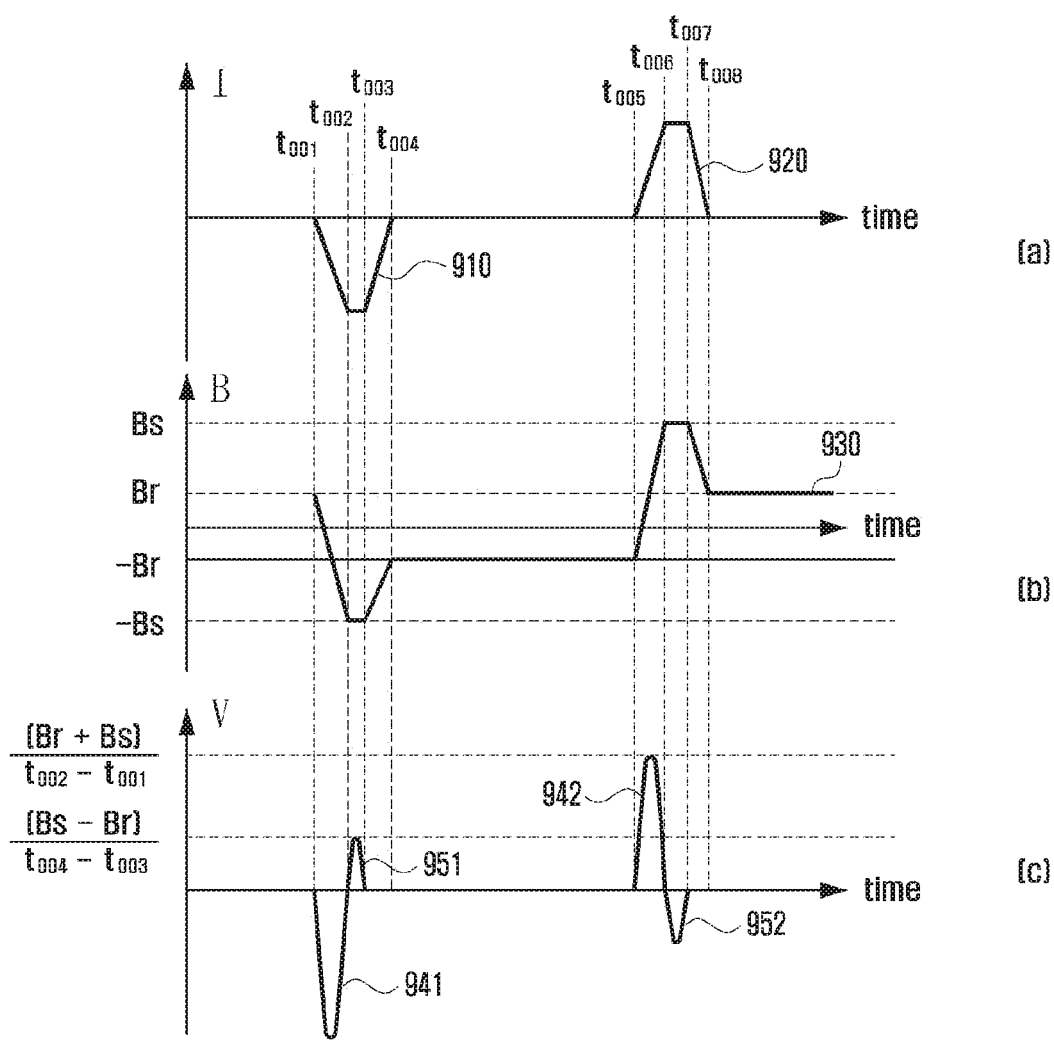
FIG. 9 is timing diagrams explaining magnetic stripe data transmission using a coil having a core according to a third embodiment of the present disclosure.

FIG. 9 is timing diagrams explaining magnetic stripe data transmission using a coil having a core according to a third embodiment of the present disclosure.

Referring to (A) of FIG. 9, a current waveform that is similar to that as described above with reference to FIG. 4B is illustrated. Although FIG. 4B simply exemplifies pulse wave type current flow, the pulse wave type current is actually unable to flow. Accordingly, in general, current in the form as indicated by reference numerals 910 and 920 flows as exemplified in (A) of FIG. 9. Referring to (A) of FIG. 9, an opposite current is increased from time t001 to time t002, and the current having the maximum value is maintained from time t002 to time t003. From time t003 to time t004, the current is decreased again until the current becomes "0".

The same explanation can be made even with respect to current flowing in a forward direction. That is, the forward current is increased from time t005 to time t006, and the current having the maximum value is maintained from time t006 to time t007. From time t007 to time t008, the current is decreased again until the current becomes "0".

If the characteristic of the coil according to the third embodiment of the present disclosure is applied while the current flows, the magnetic field is changed in the shape as in (B) of FIG. 9. This will be described using the same timing.

As described above with reference to FIGS. 8A to 8I, if the interaction 2-magnetism characteristic core is used and the coil is wired on the core, the core maintains constant magnetism based on the interaction. In this case, the magnetism value maintained based on the interaction is determined based on the material characteristics of two cores, and as described above with reference to FIG. 7, if the two cores are made of one material, they have the same constant residual magnetic flux density (Br). Accordingly, it is assumed that a constant residual magnetic flux density value is maintained unless too long time elapses.

In this case, at time t001, the residual magnetic flux density has a value of +Br, and since an opposite current flows from time t001 to time t002, the residual magnetic flux density is changed. The residual magnetic flux density may be changed until it reaches the opposite saturated magnetic flux density of the interaction 2-magnetism characteristic core. In the present disclosure, it is assumed that the interaction 2-magnetism characteristic core reaches the opposite saturated magnetic flux density by the current flowing from time t001 to time t002.

Thereafter, since the current is constantly maintained from time t002 to time t003, the saturated magnetic flux density of the interaction 2-magnetism characteristic core is maintained. If the interaction 2-magnetism characteristic core cannot reach the saturated magnetic flux density, the interaction 2-magnetism characteristic core may be made to having the saturated magnetic flux density through the current flowing from time t001 to time t002.

Thereafter, if the current is decreased from time t003 to time t004, as described above with reference to FIG. 4B, the opposite peak is detected in the reception terminal 100. However, in the interaction 2-magnetism characteristic core according to the present disclosure, the magnetic flux density is changed only up to the opposite residual magnetic flux density (−Br) due to the anisotropic characteristics of the interaction 2-magnetism characteristic core even if a predetermined amount of opposite current flows from time t003 to time t004. Thereafter, although the residual magnetic flux density may be lowered very slowly in accordance with time, such a slight change is disregarded in the present disclosure.

Accordingly, it is assumed that up to the time when the next forward current flows, the magnetic flux density is maintained up to the opposite residual magnetic flux density (−Br). Under such an assumption, if the forward current is increased again from time t005 to time t006 that is the magnetic stripe data transmission time, the residual magnetic flux density has a value of −Br at time t005, and since the opposite current flows from time t001 to time t002, the residual magnetic flux density is changed. The residual magnetic flux density may be changed until it reaches the opposite saturated magnetic flux density of the interaction 2-magnetism characteristic core. In the present disclosure, it is assumed that the interaction 2-magnetism characteristic core reaches the opposite saturated magnetic flux density by the current flowing from time t005 to time t006.

Thereafter, since the current is constantly maintained from time t006 to time t007, the saturated magnetic flux density of the interaction 2-magnetism characteristic core is maintained. If the interaction 2-magnetism characteristic core cannot reach the saturated magnetic flux density until time t006, the interaction 2-magnetism characteristic core may be made to having the saturated magnetic flux density through the current flowing from time t006 to time t007.

Thereafter, if the current is decreased from time t007 to time t008, as described above with reference to FIG. 4B, the opposite peak is detected in the reception terminal 100. However, in the interaction 2-magnetism characteristic core according to the present disclosure, the magnetic flux density is changed only up to the opposite residual magnetic flux density (−Br) due to the anisotropic characteristics of the interaction 2-magnetism characteristic core even if a predetermined amount of opposite current flows from time t007 to time t008. Accordingly, it may be seen that the opposite peak is not detected or only a very low noise exists in the receiver.

This will be described with reference to (C) of FIG. 9. In the transmission terminal 200 having the interaction 2-magnetism characteristic core, the magnetic characteristics changed by the opposite current as indicated by reference numeral 910 can be calculated as in mathematical expression 2 below.

$$\frac{(B_s + B_r)}{t002 - t001} \quad \text{[Mathematical expression 2]}$$

The mathematical expression 2 is to calculate a value that is obtained by dividing variation of the magnetic flux density by time in case where the current is supplied as shown in (C) of FIG. 9. Accordingly, the peak for data transmission can have a sufficiently large value. That is, the variation of the magnetic flux density becomes larger as compared with the case explained with reference to FIGS. 4A to 4D.

In contrast, the opposite peak that causes a noise or malfunction in the reception terminal 100 is calculated as in mathematical expression 3 below.

$$\frac{(B_s + B_r)}{t004 - t003} \quad \text{[Mathematical expression 3]}$$

The mathematical expression 3 is to calculate a value that is obtained by dividing variation of the magnetic flux density by time in case where the current is supplied as shown in (C) of FIG. 9. As described above, since the variation of the magnetic flux density is relatively decreased in comparison to the case as described above with reference to FIGS. 4A to 4D, the opposite peak that acts as a noise in the reception terminal is reduced. As a result, mathematical expressions 2 and 3 may exemplify a specific type of mathematical expression 1. Further, in the present disclosure, the voltage transition section in mathematical expression 3 should have a value that is smaller than 25% of a baud rate.

Accordingly, in the reception terminal 100, the actually desired change of the magnetic field is improved as indicated by reference numerals 941 and 942, and the opposite peak that acts as a noise is lowered as indicated by reference numerals 951 and 952.

FIGS. 10A and 10B are simulation graphs of opposite peaks detected using a general core and an interaction 2-magnetism characteristic core according to the present disclosure in case of supplying a pulse-type current to a coil of a device for magnetic stripe data transmission.

Figure 10:
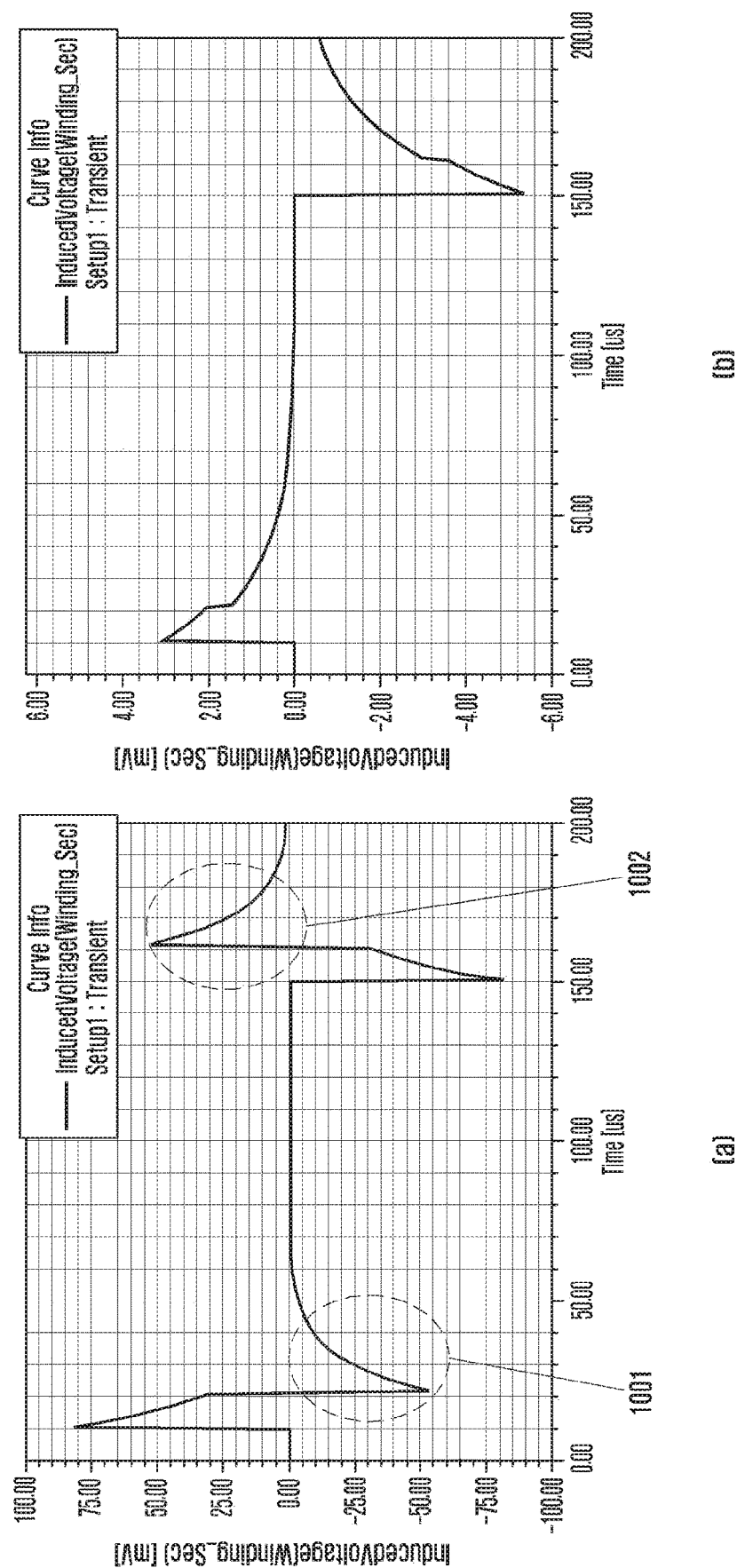
FIG. 10 is simulation graphs of opposite peaks detected using a general core and an interaction 2-magnetism characteristic core according to the present disclosure in case of supplying a pulse-type current to a coil of a device for magnetic stripe data transmission.

(A) of FIG. 10 exemplifies a waveform diagram of a voltage detected in the reception device 100 in case where a generally widely used ferrite core is used as a core of a coil of a magnetic stripe data transmission device. As can be seen from reference numerals 1001 and 1002 in (A) of FIG. 10, a considerably high opposite peak occurs. As a result, such an opposite peak may cause malfunction in the reception device during the magnetic stripe data transmission.

In contrast, (B) of FIG. 10 illustrates a case where an interaction 2-magnetism characteristic core according to the present disclosure is used as a core of the coil of the magnetic strip data transmission device. As can be seen from (B) of FIG. 10, it can be identified that an opposite peak does not occur as the result of simulation. Accordingly, in case of using the interaction 2-magnetism characteristic core according to the present disclosure, current consumption can be reduced in comparison to the existing core, and malfunction can be prevented.

Figure 11:
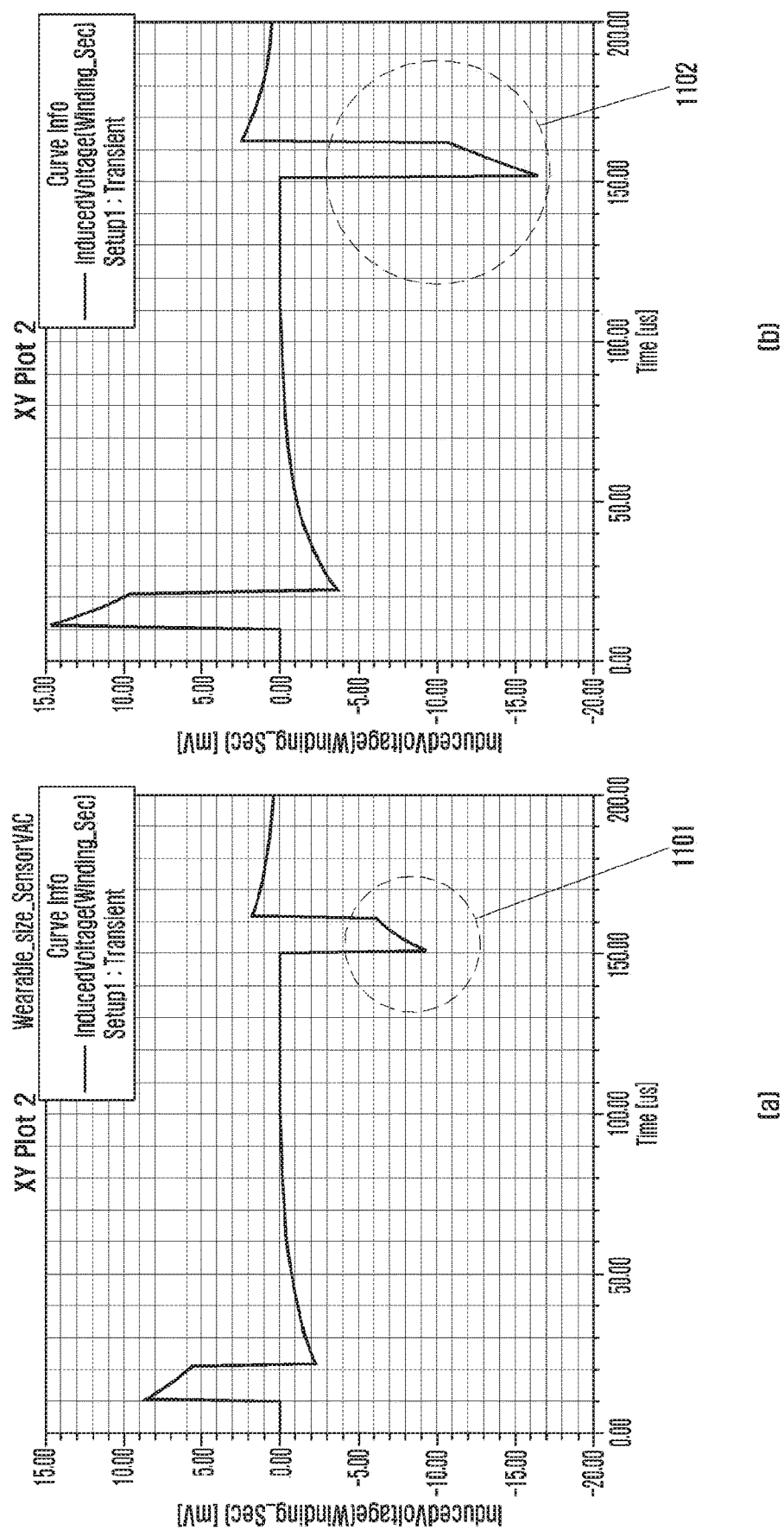
FIG. 11 is exemplary graphs illustrating voltage variation detected by a reception terminal in case of applying a third embodiment of the present disclosure.

FIGS. 11 (A) and (B) are exemplary graphs illustrating voltage variation detected by a reception terminal in case of applying a third embodiment of the present disclosure.

(A) of FIG. 11 is a graph exemplifying voltage variation detected by the reception terminal 100 in case of using a core of a semi hard magnetic material, and (B) of FIG. 11 is a graph exemplifying voltage variation detected by the reception terminal 100 in case of using the interaction 2-magnetism characteristic core. In case of (B) of FIG. 11, it can be seen that a higher voltage is induced in the reception terminal 100 in the data transmission period as compared with the case of (A) of FIG. 11. Further, referring to (A) of FIG. 11, it can be known that the opposite peak has a similar level value through the use of the core of the semi hard magnetic material according to the present disclosure.

As a result, the opposite peak value can be greatly reduced in case of configuring the core of the coil only with the semi hard magnetic material according to the present disclosure even if intermittent (pulse type, triangular waveform or similar pulse type) current is supplied from the transmission terminal 200.

In the above-described explanation, respective embodiments are dividedly described one by one. However, it will be apparent to those of ordinary skill in the art that all the respective embodiments may be applied to one transmission device, and if needed, only a specific embodiment may be applied.

Further, the embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments. For example, although various types are intended to be exemplified in FIGS. 8A to 8I, all types in which the core is configured using magnetic materials are unable to be exemplified as a whole, but various modifications configuring based on the concept of the present disclosure and the same contents become possible.

INDUSTRIAL APPLICABILITY

The present disclosure is used to transmit data using magnetism.

The invention claimed is:
1. A device for magnetic stripe data transmission comprising:
 a coil to which current is supplied in a first direction and a second direction that is opposite to the first direction;
 a core configured to induce a magnetic field when the current is supplied to the coil;
 a power source configured to supply the current to the coil;
 driving circuits configured to intermittently supply a burst pulse or similar burst pulse current supplied from the power source to the coil in the first direction or the second direction; and
 a controller configured to output to the driving circuits a control signal for controlling the current to be supplied to the coil alternately in the first direction and the second direction,
 wherein the core is made of a first core having a squareness ratio of 0.5 or more, having a coercivity value of 1000 to 10000 [A/m], and having a semi hard magnetic density having a saturated magnetic flux density value of 1 [T] or more.

2. The device of claim 1, wherein the coil is wired on the core or is slice-printed on the core in a spiral pattern.

3. The device of claim 1, wherein the core further comprises a second core having a soft magnetic density,
- magnetic fields induced in the first core having the semi hard magnetic density and the second core having the soft magnetic density are coupled to each other within a distance in which an organic interaction is possible, and
- the second core has a coercivity value that is equal to or larger than 10 [A/m] and smaller than 1000 [A/m], and has a saturated magnetic flux density value that is smaller than 1.5 [T].

4. The device of claim 3, wherein the coil is wired to surround the first core or a junction portion of the first core and the second core.

5. The device of claim 3, wherein the coil is slice-printed on at least one of the first core and the second core in a spiral pattern.

6. The device of claim 1, further comprising a low-pass filter connected between the power source and the driving circuit.

7. The device of claim 1, further comprising a current adjustment circuit configured to adjust, if the burst pulse or similar burst pulse current is blocked after being supplied to the coil, the current so that the current is gradually attenuated to be blocked for a predetermined first time from a falling edge of the burst pulse or similar burst pulse current.

8. The device of claim 7, wherein the current adjustment circuit adjusts a current flow in a stairs form.

9. The device of claim 7, wherein the current adjustment circuit comprises a capacitor connected between the coil and one of the driving circuits.

10. The device of claim 9, wherein the current adjustment circuit further comprises a resistor connected in parallel to the capacitor.

11. The device of claim 1, wherein the driving circuits comprise a first driving circuit and a second driving circuit,
- wherein the first driving circuit is configured so that a first switch and a second switch are connected in series to each other, the current is supplied to the first switch, one side of the second switch is grounded, one side of the coil is connected to a contact at which the first switch and the second switch are connected in series to each other, and the current direction and discontinuous current supply are performed based on turn-on and turn-off operations of the first switch and the second switch, and
- wherein the second driving circuit is configured so that a third switch and a fourth switch are connected in series to each other, the current is supplied to the third switch, one side of the fourth switch is grounded, the other side of the coil is connected to a contact at which the third switch and the fourth switch are connected in series to each other, and the current direction and discontinuous current supply are performed based on turn-on and turn-off operations of the third switch and the fourth switch.

12. A device for magnetic stripe data transmission comprising:
- a coil to which current is supplied in a first direction and a second direction that is opposite to the first direction;
- a current adjustment circuit configured to adjust, if a burst pulse or similar burst pulse current is supplied to the coil, the current so that the current is gradually attenuated for a predetermined time from a falling edge of the current;
- a power source configured to supplying the current to the coil;
- driving circuits configured to intermittently supply the burst pulse or similar burst pulse current supplied from the power source to the coil in the first direction or the second direction; and
- a controller configured to output to the driving circuits a control signal for controlling the current to be supplied to the coil alternately in the first direction and the second direction,
- wherein the current adjustment circuit includes a capacitor connected in series to the coil.

13. The device of claim 12, wherein the current adjustment circuit further comprises a resistor connected in parallel to the capacitor.

14. The device of claim 12, wherein the controller is configured to adjust current attenuation of the current adjustment circuit by controlling a value of the capacitor corresponding to a power capacity remaining in a battery of the device through reading of the capacitor value.

15. A device for magnetic stripe data transmission comprising:
- a coil to which current is supplied in a first direction and a second direction that is opposite to the first direction;
- a power source configured to supplying the current to the coil;
- a current adjustment circuit configured to adjust, when a burst pulse or similar burst pulse current is blocked after being intermittently supplied to the coil, the current so that the current is attenuated and blocked in a stairs form;
- driving circuits configured to supply the burst pulse or similar burst pulse current intermittently supplied from the power source to the coil in the first direction or the second direction; and
- a controller configured to output a control signal for controlling the current to be supplied to the coil in the burst pulse or similar burst pulse form alternating in the first direction and the second direction.

16. The device of claim 15, wherein the controller is configured to adjust current attenuation of the current adjustment circuit by controlling a power attenuation width corresponding to a power capacity remaining in a battery of the device.

* * * * *